US012666344B2

(12) United States Patent
Li et al.

(10) Patent No.: US 12,666,344 B2
(45) Date of Patent: Jun. 23, 2026

(54) TECHNIQUES FOR ACCESS CONTROL FOR USER EQUIPMENT

(71) Applicant: QUALCOMM Incorporated, San Diego, CA (US)

(72) Inventors: Qiaoyu Li, Beijing (CN); Ruiming Zheng, Beijing (CN); Hao Xu, Beijing (CN); Umesh Phuyal, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 18/559,023

(22) PCT Filed: Jul. 28, 2021

(86) PCT No.: PCT/CN2021/108835
§ 371 (c)(1),
(2) Date: Nov. 3, 2023

(87) PCT Pub. No.: WO2023/004613
PCT Pub. Date: Feb. 2, 2023

(65) Prior Publication Data
US 2024/0236818 A1      Jul. 11, 2024

(51) Int. Cl.
*H04W 48/02* (2009.01)
*H04W 74/0833* (2024.01)
(Continued)

(52) U.S. Cl.
CPC ....... *H04W 48/02* (2013.01); *H04W 74/0833* (2013.01); *H04W 76/10* (2018.02); *H04W 84/06* (2013.01)

(58) Field of Classification Search
CPC ..... H04W 48/02; H04W 48/12; H04W 84/06; H04W 84/005; H04W 74/0833; H04W 76/10
See application file for complete search history.

(56) References Cited

U.S. PATENT DOCUMENTS

| | | | |
|---|---|---|---|
| 10,667,143 B2 | 5/2020 | Liu et al. | |
| 2014/0036737 A1* | 2/2014 | Ekpenyong | H04L 5/0035 |
| | | | 370/328 |

(Continued)

FOREIGN PATENT DOCUMENTS

| | | |
|---|---|---|
| CN | 107852225 A | 3/2018 |
| CN | 112449439 A | 3/2021 |

(Continued)

OTHER PUBLICATIONS

International Search Report and Written Opinion—PCT/CN2021/108835—ISA/EPO—Apr. 20, 2022 (2104155WO1).

*Primary Examiner* — Jamal Javaid
(74) *Attorney, Agent, or Firm* — Holland & Hart LLP

(57) ABSTRACT

Devices and techniques for wireless communications are described. A user equipment (UE) may receive, broadcasted from a base station, a system information block (SIB) including access control information (e.g., unified access control (UAC) barring information) for communications over an air-to-ground (ATG) network. In some examples, the UE may identify the UAC barring information in an information element (IE) in the SIB, in one or more IEs of a barring IE in the SIB, based on one or more access identities, based on one or more access categories, or any combination thereof. The UE may transmit, to the base station, signaling indicating an access request to the ATG network based on the receiving of the SIB, identifying the UAC barring information, or both. The UE may communicate with the (Continued)

base station over the ATG network based on the transmitting of the signaling.

22 Claims, 17 Drawing Sheets

(51) Int. Cl.
*H04W 76/10* (2018.01)
*H04W 84/06* (2009.01)

(56) References Cited

U.S. PATENT DOCUMENTS

| | | | |
|---|---|---|---|
| 2018/0083692 A1 | 3/2018 | Miranda et al. | |
| 2020/0389835 A1* | 12/2020 | Talebi Fard | .......... H04W 48/04 |
| 2021/0037452 A1 | 2/2021 | Tsuda et al. | |
| 2021/0204192 A1 | 7/2021 | Lee et al. | |
| 2021/0321327 A1* | 10/2021 | Miranda | .............. H04W 48/04 |

FOREIGN PATENT DOCUMENTS

| | | |
|---|---|---|
| CN | 112512095 A | 3/2021 |
| WO | WO-2017011141 | 1/2017 |

* cited by examiner

Broadcasting Component

1125

Communication Component

1135

Receiving Component

1130

Transmitting Component

1140

1120

1100

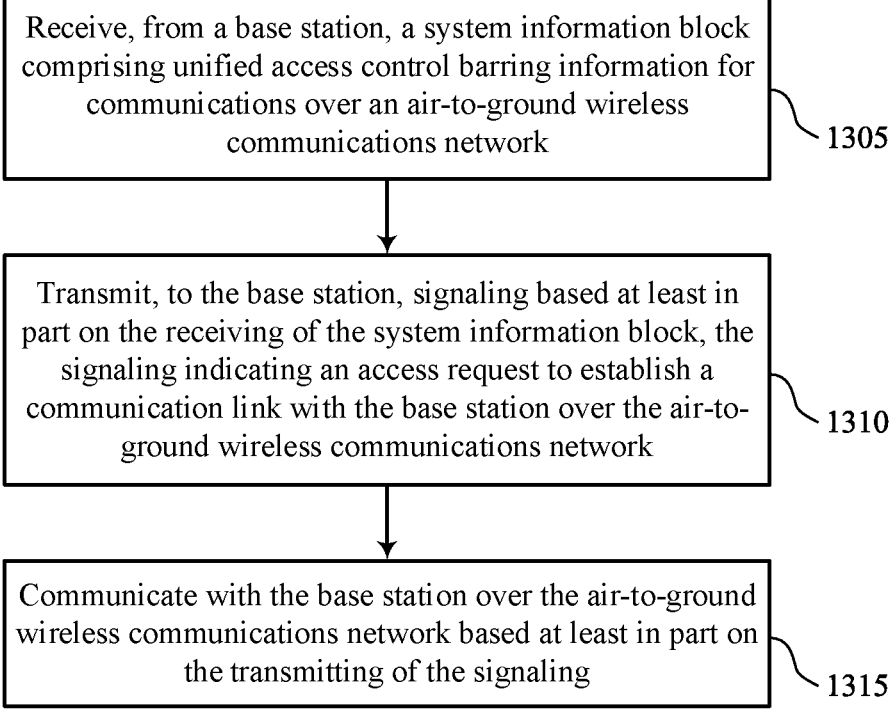

Receive, from a base station, a system information block comprising unified access control barring information for communications over an air-to-ground wireless communications network          1305

Transmit, to the base station, signaling based at least in part on the receiving of the system information block, the signaling indicating an access request to establish a communication link with the base station over the air-to-ground wireless communications network          1310

Communicate with the base station over the air-to-ground wireless communications network based at least in part on the transmitting of the signaling          1315

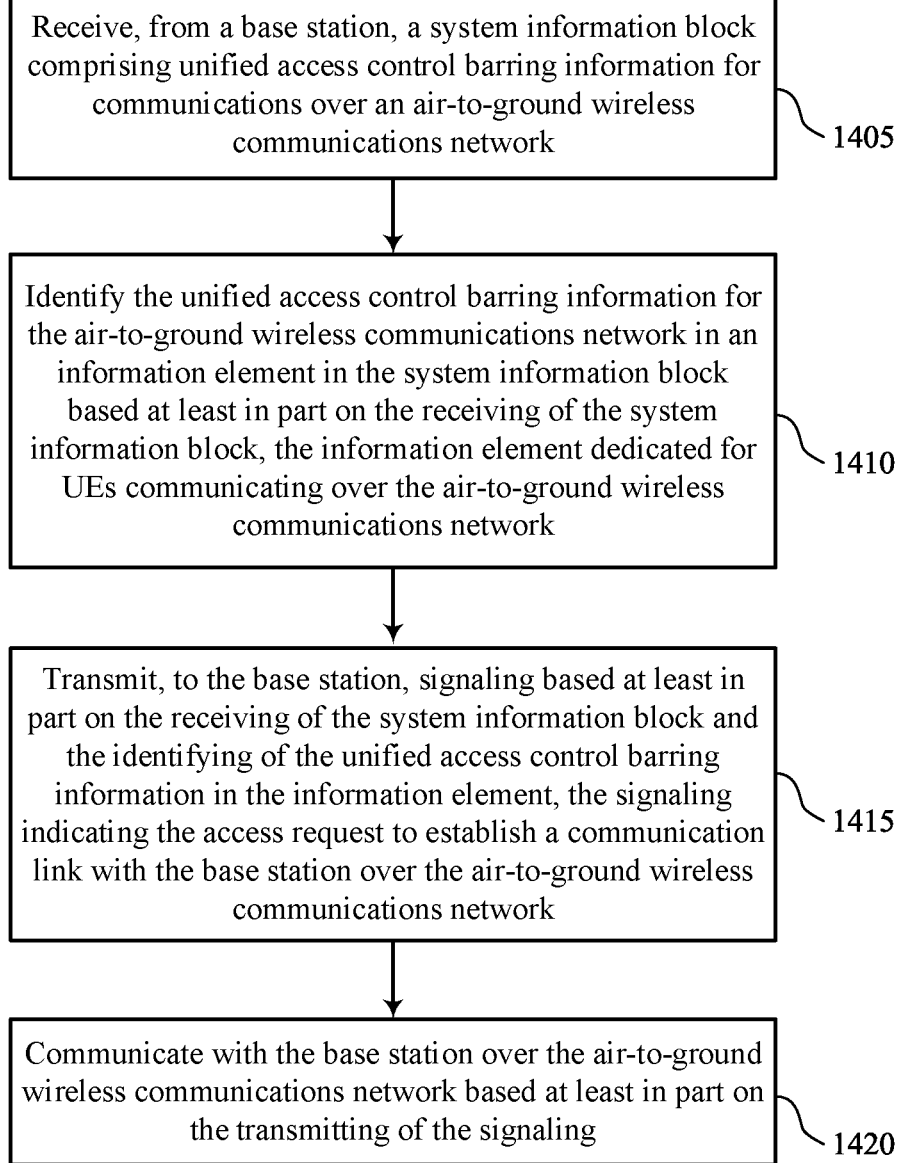

Receive, from a base station, a system information block comprising unified access control barring information for communications over an air-to-ground wireless communications network

⌐ 1405

Identify the unified access control barring information for the air-to-ground wireless communications network in an information element in the system information block based at least in part on the receiving of the system information block, the information element dedicated for UEs communicating over the air-to-ground wireless communications network

⌐ 1410

Transmit, to the base station, signaling based at least in part on the receiving of the system information block and the identifying of the unified access control barring information in the information element, the signaling indicating the access request to establish a communication link with the base station over the air-to-ground wireless communications network

⌐ 1415

Communicate with the base station over the air-to-ground wireless communications network based at least in part on the transmitting of the signaling

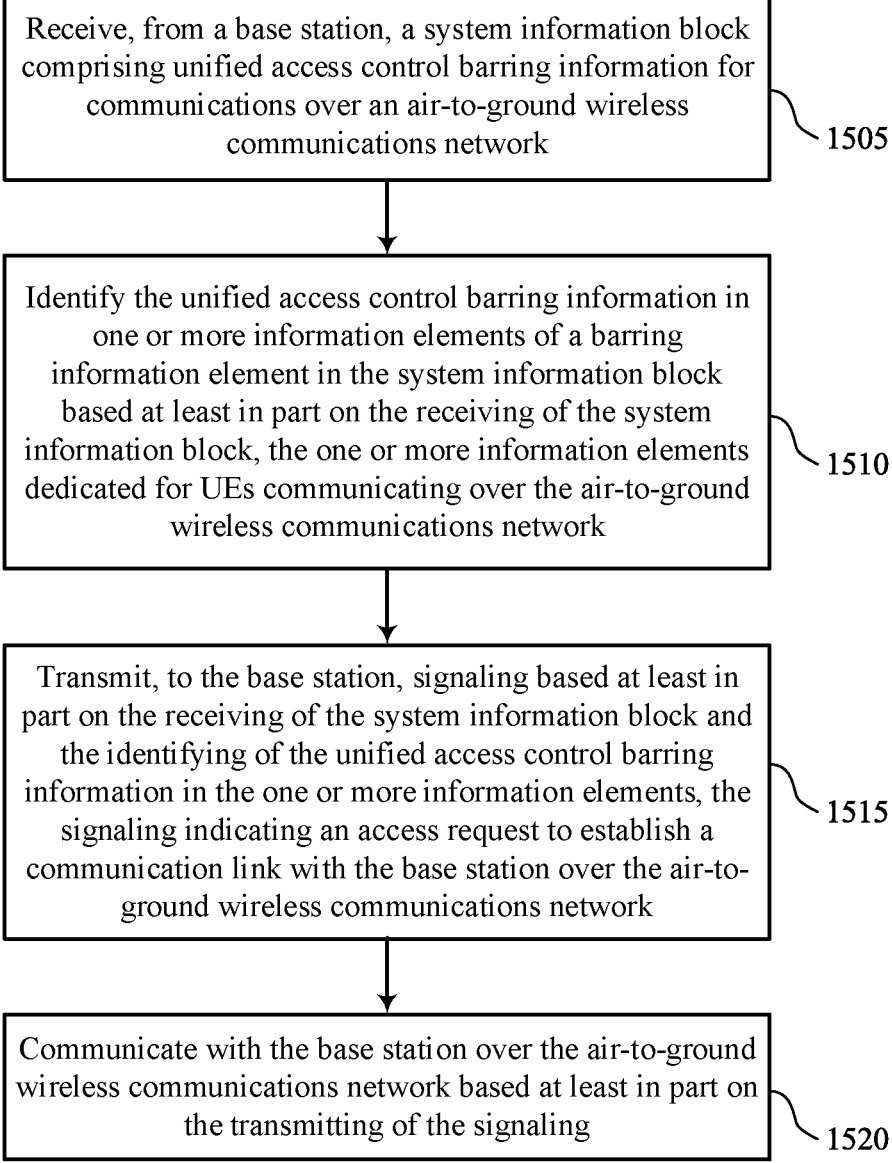

Receive, from a base station, a system information block comprising unified access control barring information for communications over an air-to-ground wireless communications network

1505

Identify the unified access control barring information in one or more information elements of a barring information element in the system information block based at least in part on the receiving of the system information block, the one or more information elements dedicated for UEs communicating over the air-to-ground wireless communications network

1510

Transmit, to the base station, signaling based at least in part on the receiving of the system information block and the identifying of the unified access control barring information in the one or more information elements, the signaling indicating an access request to establish a communication link with the base station over the air-to-ground wireless communications network

1515

Communicate with the base station over the air-to-ground wireless communications network based at least in part on the transmitting of the signaling

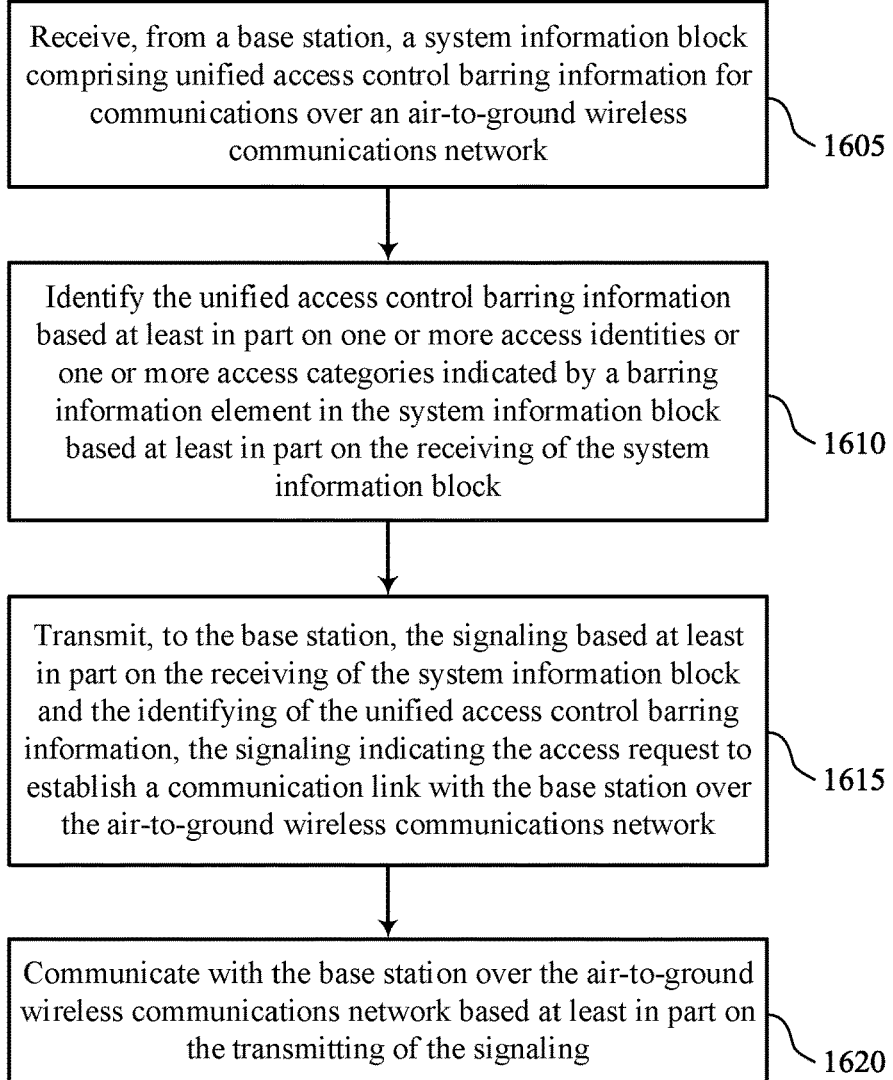

Receive, from a base station, a system information block comprising unified access control barring information for communications over an air-to-ground wireless communications network — 1605

Identify the unified access control barring information based at least in part on one or more access identities or one or more access categories indicated by a barring information element in the system information block based at least in part on the receiving of the system information block — 1610

Transmit, to the base station, the signaling based at least in part on the receiving of the system information block and the identifying of the unified access control barring information, the signaling indicating the access request to establish a communication link with the base station over the air-to-ground wireless communications network — 1615

Communicate with the base station over the air-to-ground wireless communications network based at least in part on the transmitting of the signaling — 1620

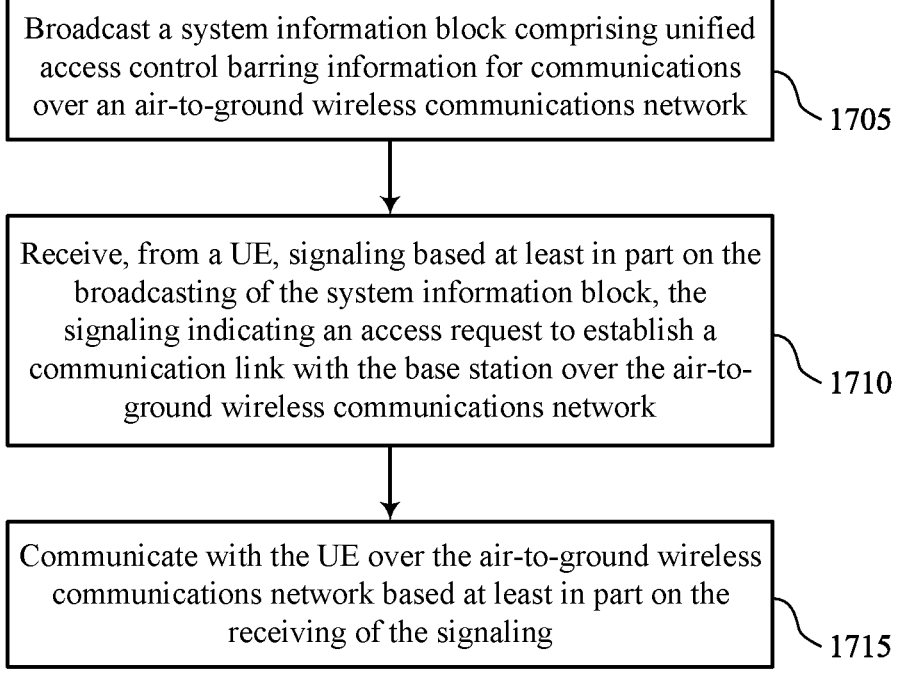

Broadcast a system information block comprising unified access control barring information for communications over an air-to-ground wireless communications network

1705

Receive, from a UE, signaling based at least in part on the broadcasting of the system information block, the signaling indicating an access request to establish a communication link with the base station over the air-to-ground wireless communications network

1710

Communicate with the UE over the air-to-ground wireless communications network based at least in part on the receiving of the signaling

TECHNIQUES FOR ACCESS CONTROL FOR USER EQUIPMENT

CROSS REFERENCE

The present Application is a 371 national stage filing of International PCT Application No. PCT/CN2021/108835 by LI et al. entitled "TECHNIQUES FOR ACCESS CONTROL FOR USER EQUIPMENT," filed Jul. 28, 2021, which is assigned to the assignee hereof, and which is expressly incorporated by reference in its entirety herein.

FIELD OF TECHNOLOGY

The following relates to wireless communications, including techniques for access control for user equipment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved techniques, devices, and apparatuses that support techniques for access control for user equipments (UEs). The described techniques provide a solution where a UE receives one or more system information blocks (SIBs) from an air-to-ground (ATG) base station, and may determine whether to access an ATG network based on one or more information elements (IEs) in the one or more SIBs, one or more access identities, one or more access categories, or any combination of these. The UE may transmit an access request to the ATG base station upon determining that the UE is allowed to access the ATG network, and may then communicate on the ATG network.

A method for wireless communications at a UE is described. The method may include receiving, from a base station, a SIB including unified access control (UAC) barring information for communications over an ATG wireless communications network, transmitting, to the base station, signaling based on the receiving of the SIB, the signaling indicating an access request to establish a communication link with the base station over the ATG wireless communications network, and communicating with the base station over the ATG wireless communications network based on the transmitting of the signaling.

An apparatus for wireless communications at a UE is described. The apparatus may include a processor, memory coupled with the processor, and instructions stored in the memory. The instructions may be executable by the processor to cause the apparatus to receive, from a base station, a SIB including UAC barring information for communications over an ATG wireless communications network, transmit, to the base station, signaling based on the receiving of the SIB, the signaling indicating an access request to establish a communication link with the base station over the ATG wireless communications network, and communicate with the base station over the ATG wireless communications network based on the transmitting of the signaling.

Another apparatus for wireless communications at a UE is described. The apparatus may include means for receiving, from a base station, a SIB including UAC barring information for communications over an ATG wireless communications network, means for transmitting, to the base station, signaling based on the receiving of the SIB, the signaling indicating an access request to establish a communication link with the base station over the ATG wireless communications network, and means for communicating with the base station over the ATG wireless communications network based on the transmitting of the signaling.

A non-transitory computer-readable medium storing code for wireless communications at a UE is described. The code may include instructions executable by a processor to receive, from a base station, a SIB including UAC barring information for communications over an ATG wireless communications network, transmit, to the base station, signaling based on the receiving of the SIB, the signaling indicating an access request to establish a communication link with the base station over the ATG wireless communications network, and communicate with the base station over the ATG wireless communications network based on the transmitting of the signaling.

Some examples of the method, apparatuses, and non-transitory computer-readable medium described herein may further include operations, features, means, or instructions for identifying the UAC barring information for the ATG wireless communications network in an IE in the SIB based on the receiving of the SIB, the IE dedicated for UEs communicating over the ATG wireless communications network, where the transmitting of the signaling indicating the access request may be based on the identifying of the UAC barring information in the IE.

Some examples of the method, apparatuses, and non-transitory computer-readable medium described herein may further include operations, features, means, or instructions for identifying the UAC barring information in one or more IEs of a barring IE in the SIB based on the receiving of the SIB, the one or more IEs dedicated for UEs communicating over the ATG wireless communications network, where the transmitting of the signaling indicating the access request may be based on the identifying of the UAC barring information in the one or more IEs.

Some examples of the method, apparatuses, and non-transitory computer-readable medium described herein may further include operations, features, means, or instructions for identifying the UAC barring information based on one or more access identities indicated by a barring IE in the SIB based on the receiving of the SIB, where the transmitting of the signaling indicating the access request may be based on the identifying of the UAC barring information that may be based on the one or more access identities.

In some examples of the method, apparatuses, and non-transitory computer-readable medium described herein, the one or more access identities may be dedicated for UEs communicating over the ATG wireless communications network.

Some examples of the method, apparatuses, and non-transitory computer-readable medium described herein may further include operations, features, means, or instructions for identifying the UAC barring information based on one or more access categories indicated by a barring IE in the SIB based on the receiving of the SIB, where the transmitting of the signaling indicating the access request may be based on the identifying of the UAC barring information that may be based on the one or more access categories.

In some examples of the method, apparatuses, and non-transitory computer-readable medium described herein, the one or more access categories may be dedicated for UEs communicating over the ATG wireless communications network.

Some examples of the method, apparatuses, and non-transitory computer-readable medium described herein may further include operations, features, means, or instructions for identifying, in the SIB, second UAC barring information dedicated for terrestrial wireless devices communicating over the ATG wireless communications network, where the transmitting of the signaling indicating the access request may be based on the identifying of the second UAC barring information.

Some examples of the method, apparatuses, and non-transitory computer-readable medium described herein may further include operations, features, means, or instructions for selecting the UAC barring information or the second UAC barring information to use for accessing the ATG wireless communications network, where the transmitting of the signaling indicating the access request may be based on the selecting of the UAC barring information or the second UAC barring information.

Some examples of the method, apparatuses, and non-transitory computer-readable medium described herein may further include operations, features, means, or instructions for receiving, from the base station, second signaling indicating one or more transmission parameters associated with the ATG wireless communications network, where the communicating with the base station may be further based on the receiving of the second signaling.

In some examples of the method, apparatuses, and non-transitory computer-readable medium described herein, the one or more transmission parameters include a timing advance (TA) value, a subcarrier spacing (SCS), a cyclic prefix (CP) length, or any combination thereof.

In some examples of the method, apparatuses, and non-transitory computer-readable medium described herein, the access request includes a random access request of a random access channel (RACH) procedure.

In some examples of the method, apparatuses, and non-transitory computer-readable medium described herein, the ATG wireless communications network may be configured for aircraft passenger communications, air traffic management, aircraft surveillance, aircraft maintenance, or any combination thereof.

A method for wireless communications at a base station is described. The method may include broadcasting a SIB including UAC barring information for communications over an ATG wireless communications network, receiving, from a UE, signaling based on the broadcasting of the SIB, the signaling indicating an access request to establish a communication link with the base station over the ATG wireless communications network, and communicating with the UE over the ATG wireless communications network based on the receiving of the signaling.

An apparatus for wireless communications at a base station is described. The apparatus may include a processor, memory coupled with the processor, and instructions stored in the memory. The instructions may be executable by the processor to cause the apparatus to broadcast a SIB including UAC barring information for communications over an ATG wireless communications network, receive, from a UE, signaling based on the broadcasting of the SIB, the signaling indicating an access request to establish a communication link with the base station over the ATG wireless communications network, and communicate with the UE over the ATG wireless communications network based on the receiving of the signaling.

Another apparatus for wireless communications at a base station is described. The apparatus may include means for broadcasting a SIB including UAC barring information for communications over an ATG wireless communications network, means for receiving, from a UE, signaling based on the broadcasting of the SIB, the signaling indicating an access request to establish a communication link with the base station over the ATG wireless communications network, and means for communicating with the UE over the ATG wireless communications network based on the receiving of the signaling.

A non-transitory computer-readable medium storing code for wireless communications at a base station is described. The code may include instructions executable by a processor to broadcast a SIB including UAC barring information for communications over an ATG wireless communications network, receive, from a UE, signaling based on the broadcasting of the SIB, the signaling indicating an access request to establish a communication link with the base station over the ATG wireless communications network, and communicate with the UE over the ATG wireless communications network based on the receiving of the signaling.

In some examples of the method, apparatuses, and non-transitory computer-readable medium described herein, the broadcasting of the SIB may include operations, features, means, or instructions for broadcasting the UAC barring information for the ATG wireless communications network in an IE in the SIB, the IE dedicated for UEs communicating over the ATG wireless communications network, where the receiving of the signaling indicating the access request may be based on the broadcasting of the UAC barring information in the IE.

In some examples of the method, apparatuses, and non-transitory computer-readable medium described herein, the broadcasting of the SIB may include operations, features, means, or instructions for broadcasting the UAC barring information in one or more IEs of a barring IE in the SIB, the one or more IEs dedicated for UEs communicating over the ATG wireless communications network, where the receiving of the signaling indicating the access request may be based on the broadcasting of the UAC barring information in the one or more IEs.

In some examples of the method, apparatuses, and non-transitory computer-readable medium described herein, the broadcasting of the SIB may include operations, features, means, or instructions for broadcasting, in the SIB one or more access identities in a barring IE, the one or more access identities associated with the UAC barring information, where the receiving of the signaling indicating the access request may be based on the broadcasting of the one or more access identities.

In some examples of the method, apparatuses, and non-transitory computer-readable medium described herein, the one or more access identities may be dedicated for UEs communicating over the ATG wireless communications network.

In some examples of the method, apparatuses, and non-transitory computer-readable medium described herein, the broadcasting of the SIB may include operations, features, means, or instructions for broadcasting, in the SIB one or more access categories in a barring IE, the one or more access categories associated with the UAC barring information, where the receiving of the signaling indicating the access request may be based on the broadcasting of the one or more access categories.

In some examples of the method, apparatuses, and non-transitory computer-readable medium described herein, the one or more access categories may be dedicated for UEs communicating over the ATG wireless communications network.

In some examples of the method, apparatuses, and non-transitory computer-readable medium described herein, the broadcasting of the SIB may include operations, features, means, or instructions for broadcasting, in the SIB, second UAC barring information dedicated for terrestrial wireless devices communicating over the ATG wireless communications network, where the broadcasting of the second UAC barring information may be based on a congestion metric at the base station, a time of day, or both.

Some examples of the method, apparatuses, and non-transitory computer-readable medium described herein may further include operations, features, means, or instructions for receiving, from a second UE, second signaling based on the broadcasting of the second UAC barring information, the second signaling indicating a second access request to establish a second communication link with the base station over the ATG wireless communications network and communicating with the second UE over the ATG wireless communications network based on the receiving of the second signaling.

Some examples of the method, apparatuses, and non-transitory computer-readable medium described herein may further include operations, features, means, or instructions for transmitting, to the UE, second signaling indicating one or more transmission parameters associated with the ATG wireless communications network, where the communicating with the UE may be further based on the transmitting of the second signaling.

In some examples of the method, apparatuses, and non-transitory computer-readable medium described herein, the one or more transmission parameters include a TA value, an SCS, a CP length, or any combination thereof.

In some examples of the method, apparatuses, and non-transitory computer-readable medium described herein, the access request includes a random access request of a RACH procedure.

In some examples of the method, apparatuses, and non-transitory computer-readable medium described herein, the ATG wireless communications network may be configured for aircraft passenger communications, air traffic management, aircraft surveillance, aircraft maintenance, or any combination thereof.

BRIEF DESCRIPTION OF THE DRAWINGS

FIGS. 13 through 17 show flowcharts illustrating methods that support techniques for access control for user equipment in accordance with aspects of the present disclosure.

DETAILED DESCRIPTION

Figure 1:
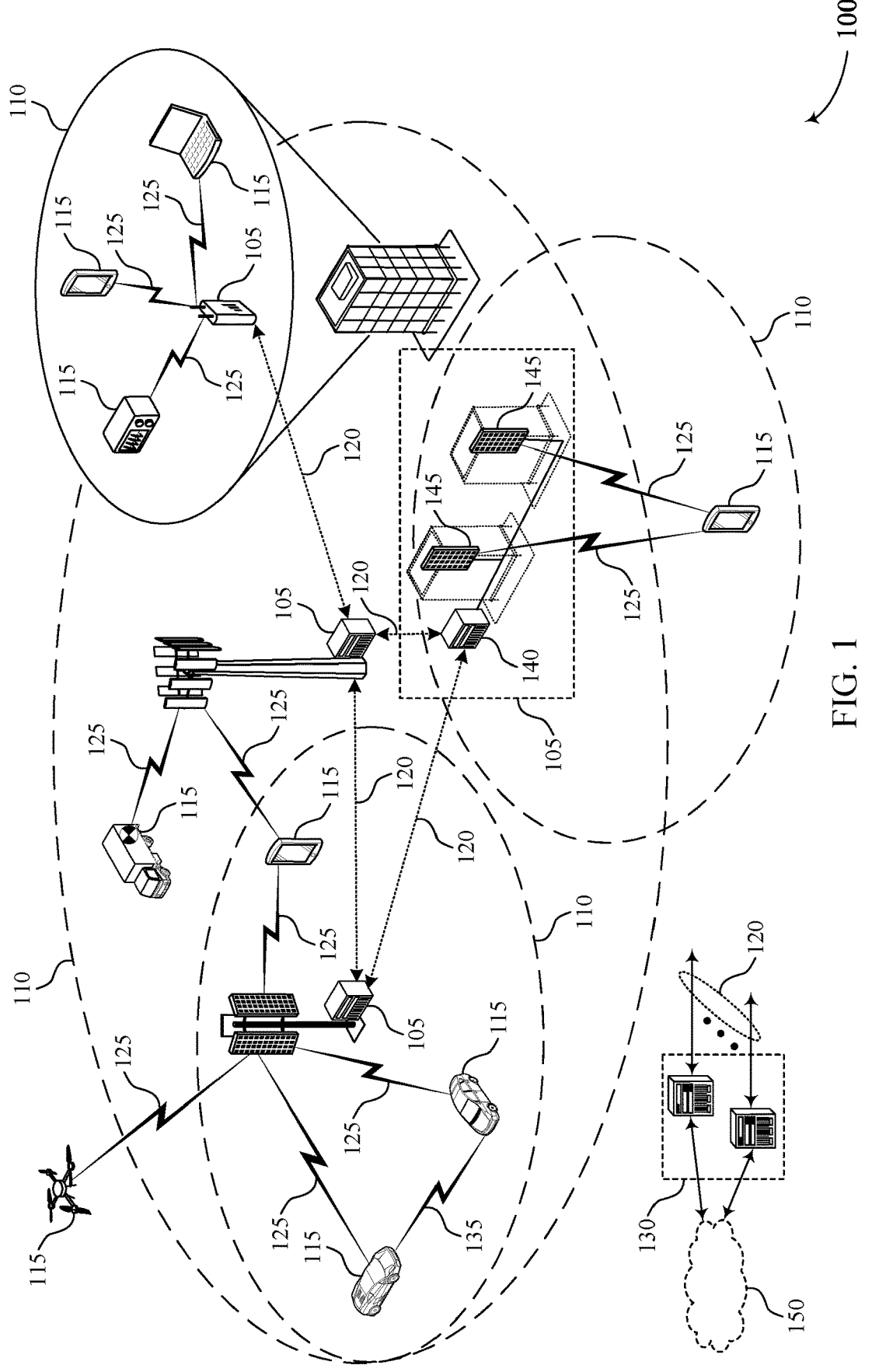
FIGS. 1, 2, and 3 illustrate examples of wireless communications systems that support techniques for access control for user equipment in accordance with aspects of the present disclosure.

In some wireless communications systems, a user equipment (UE) and a base station (e.g., a gigaNodeB (gNB)) may communicate using an air-to-ground (ATG) network. Such UEs and base stations may be referred to as ATG-UEs and ATG-gNBs. For example, an airplane may include one or more ATG-UEs, which may communicate with one or more ATG-gNBs. In some cases, other UEs, sometimes referred to as terrestrial UEs (e.g., a cell phone) that communicate over a terrestrial network, may be able to communicate using the ATG network. For example, terrestrial UEs that are close to runways or located in airplane cabins may be able to communicate using the ATG network. However, in some cases, terrestrial UEs that communicate using the ATG network may cause interference in other communications in the ATG network (e.g., communications between an ATG-UE and an ATG-gNB). However, in some other cases, an ATG-gNB may be communicating with relatively few ATG-UEs (e.g., at nighttime), and it may be beneficial to enable terrestrial UEs to communicate using the ATG network via the ATG-gNB to reduce communication loads for other gNBs (e.g., terrestrial gNBs).

To increase the efficiency and effectiveness of ATG network support of UEs in various situations, ATG-gNBs may flexibly enable UEs (e.g., ATG-UEs, terrestrial UEs) to access the ATG network using a unified access control (UAC) protocol. For example, when an ATG-gNB broadcasts one or more system information blocks (SIBs) to one or more devices (e.g., terrestrial UEs, ATG-UEs, or the like), the ATG-gNB may include one or more ATG-specific information elements (IEs) in the broadcast with the one or more SIBs. Such ATG-specific IEs may be identifiable by ATG devices (e.g., ATG-UEs). In some cases, such ATG-specific IEs may not be identifiable by other devices (e.g., terrestrial UEs) that are not enabled to communicate over the ATG network. UEs that are able or not able to identify such ATG-specific IEs may determine that the UEs are able or allowed, or not able or not allowed, respectively, to communicate using the ATG network.

In some other examples, when the ATG-gNB transmits the one or more SIBs to the one or more devices, the ATG-gNB may include one or more IEs (e.g., identifiable by devices such as terrestrial UEs), at least some of which may include one or more ATG-specific sub-IEs (e.g., identifiable by devices such as ATG-UEs and, in some cases, not identifiable by devices such as terrestrial UEs), in the transmission with the one or more SIBs. UEs that are able or not able to identify such ATG-specific sub-IEs may determine that the UEs are able or allowed, or not able or not allowed, respectively, to communicate using the ATG network.

In some other examples, ATG-UEs may be configured with one or more ATG-specific access identities, access categories, or both. Upon receiving one or more SIBs in a transmission, a UE may identify an IE included in the transmission and check one or more access identities, categories, or both. UEs that are able or not able to identify the ATG-specific access identities, categories, or both (e.g., due to not being configured with these access identities, categories, or both) may determine that the UEs are able or allowed, or not able or not allowed, respectively, to communicate using the ATG network. By implementing the ATG-specific IEs, sub-IEs, access identities or categories, or any combination of these, ATG-gNBs may be able to flexibly enable terrestrial UEs to access the ATG network.

Aspects of the disclosure are initially described in the context of wireless communications systems. Aspects of the disclosure are further illustrated by and described with reference to a process flow, apparatus diagrams, system diagrams, and flowcharts that relate to techniques for access control for UEs.

FIG. 1 illustrates an example of a wireless communications system 100 that supports techniques for access control for user equipment in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing (SCS) are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix (CP) prepended to each symbol period). In some wireless communications systems 100, a slot may further be divided into multiple mini-slots containing one or more symbols. Excluding the CP, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

According to the techniques described herein, a base station 105 associated with an ATG network may flexibly enable UEs 115 to access the ATG network using a UAC protocol. A base station 105 may broadcast a SIB, which may include one or more IEs, sub-IEs, or both, to one or more UEs 115. The one or more UEs 115 may identify UAC barring information in the one or more IEs, sub-IEs, or both, or based on one or more access identities, access categories, or both, indicated in the one or more IEs. The one or more UEs 115 may transmit an access request to the base station 105, and the base station 105 may communicate with the one or more UEs 115 using the ATG network.

Figure 2:
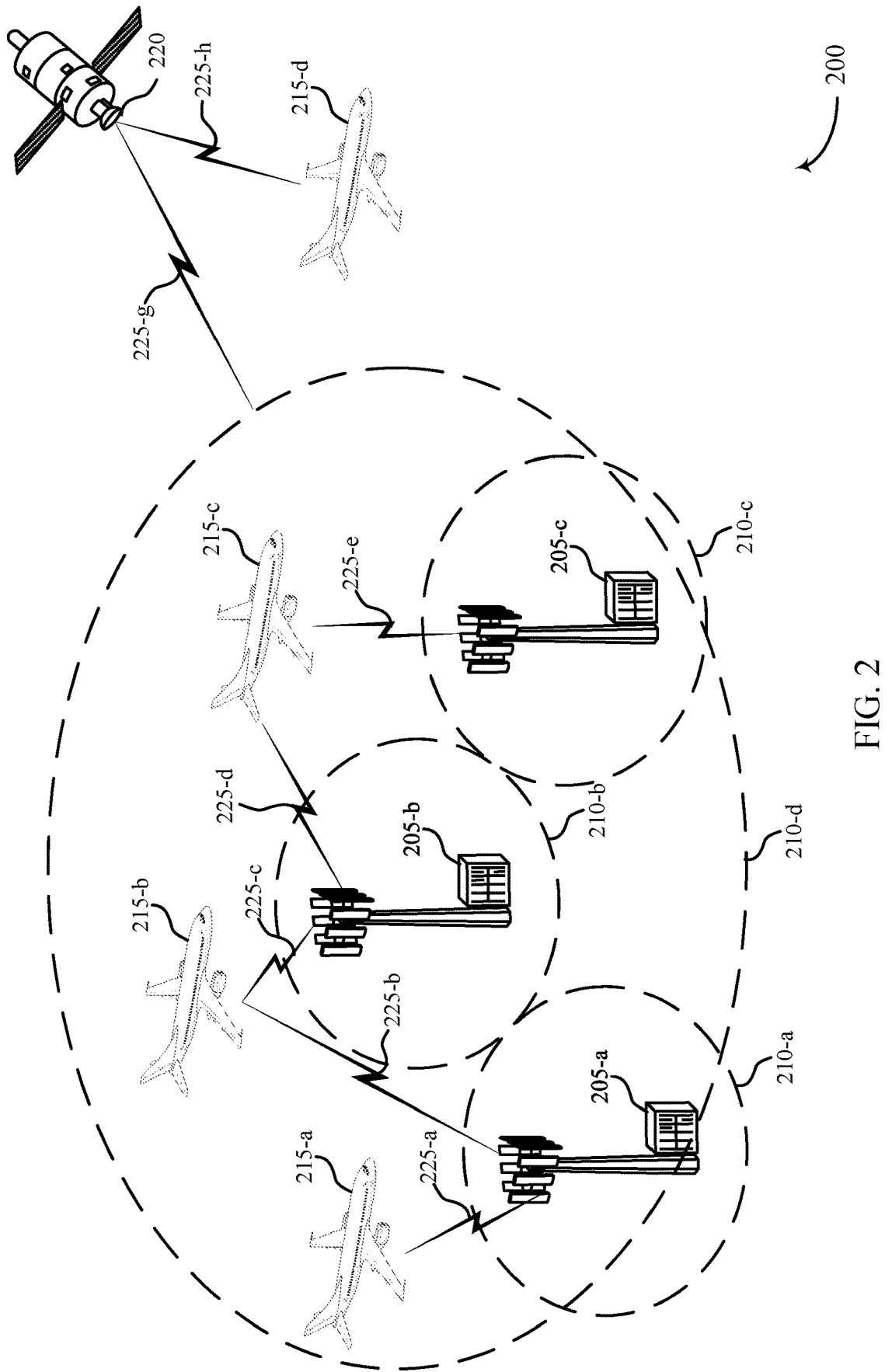

FIG. 2 illustrates an example of a wireless communications system 200 that supports techniques for access control for user equipment in accordance with aspects of the present disclosure. The wireless communications system 200 may implement or be implemented by aspects of the wireless communications system 100 as described with reference to FIG. 1. For example, the wireless communications system 200 may include base stations 205 and UEs 215, which may be examples of corresponding devices described with reference to FIG. 1. The wireless communications system 200 may support improvements to communications reliability, power consumption, and load balancing at one or more devices, among other benefits.

The base stations 205 may each correspond to a coverage area 210, which may be an example of a coverage area 110 as described herein with reference to FIG. 1. For example, the base station 205-a may serve a coverage area 210-a, the base station 205-b may serve a coverage area 210-b, and the base station 205-c may serve a coverage area 210-c. The base stations 205 may communicate with UEs 215 via one or more communication links 225. For example, the communication links 225 may be examples of communication links 125 as described herein with reference to FIG. 1. In some examples, the UEs 215 may be examples of airplanes or other wireless devices (e.g., drones, vehicles, or other examples of wireless communications devices).

The wireless communications system 200 may support various types of communications, such as ATG communications. For example, in an in-land or coastal area, the base station 205-a (e.g., a gNB, such as an ATG-gNB) may be on the ground and transmit communications via an antenna that is tilted up towards the UE 215-a. The UE 215-a may be an example of an ATG-UE and may receive the communications with an antenna pointing down (e.g., the UE 215-a may include antennas at the bottom of the UE 215-a). For example, an antenna of the aircraft UE 215-a may be mounted at a bottom of the aircraft (e.g., antennas with beamforming capabilities). Such wireless communications may be relatively low cost, relatively high throughput, realize lower latency, or any combination thereof, compared to satellite communications with a satellite 220. In some examples, the wireless communications system 200 may support one or more traffic types (e.g., aircraft passenger communications, air traffic management communications, aircraft surveillance or maintenance communications, and the like).

Additionally or alternatively, the wireless communications system 200 may support communications with the satellite 220. For example, the satellite 220 may communicate with the UE 215-d (e.g., in an ocean area where the UE 215-d may be outside the coverage area 210-c associated with the base station 205-c). The satellite 220 may communicate with devices in the coverage area 210-d. For example, the base station 205-c may transmit or receive communications with the satellite 220, and the satellite 220 may transmit or receive communications with the UE 215-d via the communication link 225-h.

In some examples, the wireless communications system 200 may support TDD or FDD communications, including FDD communications in a non-terrestrial network (NTN). In some examples, the wireless communications system 200 may support relatively large inter-site distances (ISD), relatively large coverage ranges, or a combination thereof. For example, in order to control the network deployment cost and account for a quantity of flights, a large ISD may be implemented (e.g., 100 kilometers (km), 200 km, or another range). Additionally or alternatively, the distance between a UE 215 and a base station 205 may be relatively large (e.g., when a plane is above the sea, the distance may be more than 200 km), and thus the wireless communications system 200 (e.g., an ATG network) may be configured to provide a relatively large cell coverage (e.g., up to 300 km cell coverage).

In some examples, the wireless communications system 200 may support both ATG communications (e.g., an ATG network) and a terrestrial NR network. For example, interference between the terrestrial network and the ATG network may be relatively low and some operators may adopt a same frequency for deploying both networks (e.g., 4.8 GHz). In some examples, an ATG terminal (e.g., a UE 215) may have a relatively large capacity. For example, an on-board ATG terminal may be relatively more powerful than a mobile device UE 215 (e.g., the terminal may have a higher effective isotropically radiated power (EIRP), larger transmission power, or larger on-board antenna gain than some terrestrial UEs 215).

In some examples, the wireless communications system 200 may support one or more throughput attributes and specifications for NR-ATG communications. In some examples, the wireless communications system 200 may support a data rate per personal device (e.g., 15 megabits-per-second (Mbps) in the downlink and 7.5 Mbps in the uplink), which may also apply to cell-edge devices. In some examples, the wireless communications system 200 may support an end-to-end latency (e.g., 10 milliseconds (ms)). In some examples, the wireless communications system 200 may support a degree of mobility (e.g., up to 1000 km per hour (km/h)) for UEs 215. In some examples, the wireless communications system 200 may support a connection density (e.g., 80 personal devices per aircraft, 60 aircraft per 18,000 square km, or another connection density). In some cases, to enable the connection density, the wireless communications system 200 may support a quantity of sectors per cell (e.g., 3 sectors per cell) where each cell may include a quantity of supported devices (e.g., 20 aircraft). In some examples, the wireless communications system 200 may support a data rate per aircraft (e.g., 1.2 gigabits-per-second (Gbps) in the downlink, and 600 Mbps in the uplink), which may also apply to cell-edge devices. In one example, such aircraft may include 400 passengers, and at a 20% activation factor, and there may be 80 personal devices per aircraft.

In some cases, the wireless communications system 200 may be configured as described herein to support relatively large cell coverage ranges (e.g., up to 300 km), flight speeds (e.g., 1200 km/hour flight speeds), coexistence between ATG networks and terrestrial networks, ATG base station or UE core and performance thresholds, or any combination thereof. For example, the wireless communications system

200 may support a relatively large ISD (e.g., 100 km to 200 km in-land, and up to 300 km coverage along coasts). Additionally or alternatively, the wireless communications system 200 may support a relatively large timing advance (TA) (e.g., a TA value equal to 2 ms at 300 km of coverage) to avoid frequent handover and inter-cell interference.

Additionally or alternatively, wireless communications system 200 may support a relatively large per-cell throughput (e.g., a data rate of at least 1 Gbps per aircraft). For example, an aircraft may experience a 1.2 Gbps data rate for downlink communications, and a 600 Mbps data rate for uplink communications. Such large per-cell throughput may occur in airspaces that have a density of 60 aircraft per 18,000 square km, for cell coverage ranges of 134 km. In cases where aircraft or airspace densities are high (e.g., congested, such as around busy airports), data rates may decrease, but may still remain at or above the 1 Gbps data rate per aircraft specification.

Additionally or alternatively, wireless communications system 200 may support a relatively large Doppler shift in frequency (e.g., a line of sight (LoS) max Doppler shift at 1200 km/h may be about 0.77 kHz at 700 MHZ, or 3.89 kHz at 3.5 GHz, or 5.33 kHz at 4.8 GHZ), a relatively large SCS (e.g., an SCS value of 7.5 kHz at 700 MHz, or 30 kHz or 60 kHz at 3.5 GHZ, or 60 kHz at 4.8 GHz, assuming a receiver on a device may tolerate a maximum LoS Doppler shift of about 10 percent of the SCS), a relatively short coherence time, a relatively fast TA drifting, or any combination of these.

Additionally or alternatively, wireless communications system 200 may support various CP lengths or waveforms. These may support various propagation scenarios such as en-route, climbing, descending, take-off, landing, taxiing, or parking of an aircraft, and the like. In en-route, climbing, and descent propagation scenarios, signals may fade according to a Rician model due to interactions between propagation paths of signals. For example, there may be a signal delay of up to 2.5 km for en-route scenarios, corresponding to an 8.33 microseconds (μs) delay in time. In take-off, landing, taxiing, and parking propagation scenarios, signals may fade according to a Rayleigh model due to interactions between propagation paths of signals. In climbing and descent, or take-off and landing propagation scenarios, or both, a signal delay may be comparable to or less than that of en-route (e.g., still relatively large). Parking and taxi delays may be similar to terrestrial-like delays.

Additionally or alternatively, wireless communications system 200 may cause interference towards terrestrial NR systems if frequencies are reused. For example, aircraft transmission beam widths may become larger (e.g., after 100 km to 200 km of propagation), affecting a relatively wide terrestrial area. Such interference may be relatively dynamic and non-synchronized when accounting for effects of dynamic TDD and large propagation delays.

The wireless communications system 200 may communicate according to a UAC protocol. In an NR system, a UAC protocol may allow operator devices (e.g., base stations 205, or the like) to control access of subscriber devices (e.g., UEs 215, or the like) to a particular NR system or network. Depending on operator policies, deployment scenarios, subscriber profiles, available services, or any combination of these, operator devices may use different criteria in determining which access attempts by subscriber devices may be allowed or blocked (e.g., when congestion occurs in the NR system or network). These different criteria (e.g., characteristics, time, location, proximity, interference, or any other criteria) may be associated with various access identities, access categories, or both. Thus, operator devices may categorize each access attempt into one or more access identities, access categories, or both. In some cases, an access identity may be associated with a UE 215 subscription type, and an access category may be associated with a UE 215 service (e.g., emergency, voice call, or the like) that may be triggering the access attempt.

A base station 205 may transmit a SIB (e.g., SIB1) including access control information (e.g., UAC barring information) to a UE 215 for the UE 215 to identify whether some access attempts may be allowed. For example, the SIB may include an IE (e.g., uac-BarringInfo) which may include sub-IEs, information associated with or otherwise indicating different access identities, information associated with or otherwise indicating access categories, or any combination of these. The UE 215 may identify the allowed access attempts based on the IEs, sub-IEs, access identities, access categories, or any combination of these. In some examples, the IE uac-BarringInfo may include sub-IEs such as uac-BarringForCommon, uac-BarringPerPLMN-List, uac-BarringInfoSetList, and uac-AccessCategory1-SelectionAssistanceInfo, among others. In some examples, such sub-IEs may merely be IEs or otherwise function somewhat, mostly, or completely as IEs, and may be referred to as sub-IEs to merely help indicate that such sub-IEs may be nested within one or more other IEs.

Figure 3:
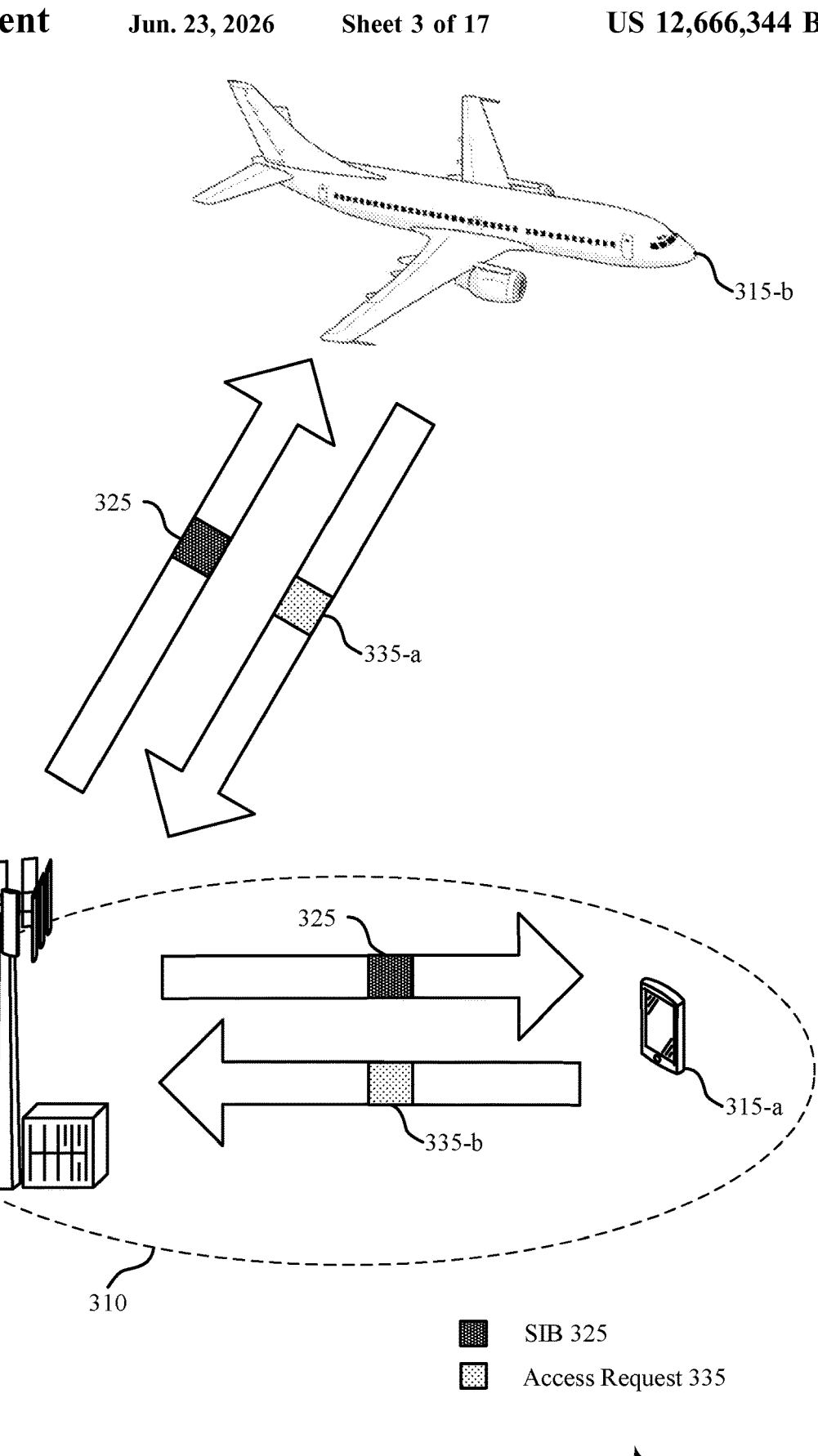

FIG. 3 illustrates an example of a wireless communications system 300 that supports techniques for access control for user equipment in accordance with aspects of the present disclosure. The wireless communications system 300 may implement or be implemented by aspects of the wireless communications system 100, wireless communications system 200, or both, as described with reference to FIGS. 1 and 2. For example, the wireless communications system 300 may include a base station 305 and one or more UEs 315, which may be examples of corresponding devices described with reference to FIGS. 1 and 2. The wireless communications system 300 may support improvements to interference, power consumption, and load balancing at one or more devices, among other benefits.

In wireless communications system 300, the base station 305 may be an example of an ATG-gNB in an ATG network. A UE 315-*b* may be an example of an ATG-UE, and may include an antenna mounted at the bottom of an aircraft, and may maintain a universal mobile telecommunications system (UMTS) air (Uu) interface access with the base station 305. In some cases, a UE 315-*a*, which may be any NR-based mobile device (e.g., a terrestrial UE, a personal cell phone, or another device), may be able to access the ATG network (e.g., by successfully decoding system information from the base station 305). For example, the UE 315-*a* may be able to access the ATG network when located relatively close to airport runways, inside or near aircraft cabins, or the like. In such scenarios, the UE 315-*a* may have a relatively poor connection with one or more terrestrial gNBs (not shown), but may be able to decode system information (e.g., in a SIB 325) from one or more ATG-gNBs (e.g., the base station 305) due to a relatively high transmission (e.g., broadcast) power from the one or more ATG-gNBs. The relatively high transmission power from the one or more ATG-gNBs may be high to satisfy the relatively high throughput specified for cell-edge aircraft. In such scenarios, the UE 315-*a* may be able to access base station 305 based on decoding the system information. In some examples, such access may cause interference in communications between the UE 315-*b* and the base station 305 (e.g., due to limited TA compensation capabilities of the UE 315-*a*) when the UE 315-*a* transmits a preamble (e.g., a random access channel (RACH) preamble, which the UE 315-*a* may transmit as part of a RACH procedure). In some other examples, such access may be beneficial, such as when base station 305 may not be experiencing heavy traffic from multiple ATG-UEs (e.g., at night). The UE 315-*a* may be able to offload traffic loads from terrestrial gNBs during these periods, and instead communicate with the relatively low-traffic base station 305.

In accordance with aspects of the present disclosure, base station 305 may flexibly enable access of mixed ATG and terrestrial UEs 315 based on various factors (e.g., proximity of the UE 315-*a* to a runway, the time of day, location within an aircraft cabin, or any combination of these). Such techniques may be based on or utilize UAC protocols.

In some examples, base station 305 may broadcast a SIB 325 (e.g., SIB1) to UEs 315 within a coverage area 310. The SIB 325 may include access control information (e.g., UAC barring information) such as an ATG-dedicated IE (e.g., uac-BarringInfo-ATG), such that any receiving device may be able to determine whether the receiving device is able or allowed to establish a type of a new access attempt. In some cases, the UE 315-*a* may be unable to identify the ATG-dedicated IE, but the UE 315-*b* (e.g., the ATG-UE) may be able to identify the ATG-dedicated IE. Thus, when the UE 315-*a* receives a SIB 325 that includes the ATG-dedicated IE, the UE 315-*a* may be unable to decode system information for communicating with the base station 305. In contrast, when the UE 315-*b* receives the SIB 325 with the ATG-dedicated IE, the UE 315-*b* may transmit an access request 335-*a* to the base station 305 to establish communications based on decoding the system information in the ATG-dedicated IE. In some cases, the access request 335-*a* may include a random access request of a RACH procedure.

Additionally or alternatively, the SIB 325 may include a non-ATG-dedicated IE (e.g., uac-BarringInfo) such that any receiving device may be able to determine whether the receiving device is able or allowed to establish a type of a new access attempt. In some cases, the UE 315-*a* may be able to identify the non-ATG-dedicated IE, but the UE 315-*b* may not be able to identify (or configured to ignore) the non-ATG-dedicated IE. Thus, when the UE 315-*a* receives a SIB 325 that includes the non-ATG-dedicated IE (e.g., as well as the ATG-dedicated IE), the UE 315-*a* may decode system information in the non-ATG-dedicated IE and transmit an access request 335-*b* (e.g., a random access request) to base station 305 to establish communications. That is, identifying access control depends on a device's ability to identify the IE that indicates that the device is able or allowed to access the ATG network. In some examples, the SIB 325 may include both the ATG-dedicated IE (e.g., uac-BarringInfo-ATG) and the non-ATG-dedicated IE (e.g., uac-BarringInfo), and thus both the UE 315-*a* and the UE 315-*b* may establish communication with base station 305 based on decoding respective system information in IEs of the SIB 325.

In some other examples, the SIB 325 may include access control information such as an ATG-dedicated sub-IE within a non-ATG-dedicated IE (e.g., uac-BarringInfo) in a SIB 325 such that any receiving device may be able to determine whether the receiving device is able or allowed to establish a type of a new access attempt. In some cases, the UE 315-*a* may be unable to identify the ATG-dedicated sub-IE, but the UE 315-*b* may be able to identify the ATG-dedicated sub-IE. Thus, when the UE 315-*a* receives a SIB 325 that includes the ATG-dedicated sub-IE, the UE 315-*a* may be unable to decode system information for communicating with the base station 305. In contrast, when the UE 315-*b* receives the SIB 325 with the ATG-dedicated sub-IE, the UE 315-*b* may transmit the access request 335-*a* to the base station 305 to establish communications based on decoding the system information in the ATG-dedicated IE. In some cases, the access request 335-*a* may include a random access request of a RACH procedure.

Additionally or alternatively, the SIB 325 may include a non-ATG-dedicated sub-IE within a non-ATG-dedicated IE (e.g., uac-BarringInfo) such that any receiving device may be able to determine whether the receiving device is able or allowed to establish a type of a new access attempt. In some cases, the UE 315-*a* may be able to identify the non-ATG-dedicated sub-IE, but the UE 315-*b* may not be able to identify (or configured to ignore) the non-ATG-dedicated sub-IE. Thus, when the UE 315-*a* receives a SIB 325 that includes the non-ATG-dedicated sub-IE (e.g., as well as the ATG-dedicated sub-IE), the UE 315-*a* may decode system information in the non-ATG-dedicated sub-IE and transmit an access request 335-*b* (e.g., a random access request) to base station 305 to establish communications. That is, identifying access control depends on a device's ability to identify the sub-IE that indicates that the device is able or allowed to access the ATG network. In some examples, the SIB 325 may include both the ATG-dedicated sub-IE (e.g., within uac-BarringInfo) and the non-ATG-dedicated sub-IE (e.g., also within uac-BarringInfo), and thus both the UE 315-*a* and the UE 315-*b* may establish communication with base station 305 based on decoding respective system information in sub-IEs of the SIB 325.

In some other examples, the UE 315-*b* may be configured with, introduced to, or otherwise apply one or more ATG-specific access identities, access categories, or both. Such ATG-specific access identities, access categories, or both may be based on (e.g., may include, may use) any reserved access identities, any access category indices, or both. Upon receiving the SIB 325 including access control information, the UE 315-*b* may identify an IE (e.g., uac-BarringInfo) included in the SIB 325 and check with the configuration associated with the access identities or access categories configured for the UE 315-*b*. That is, the UE 315-*b* may check the ATG-specific access identities, access categories, or both, which may be indicated in the IE (e.g., uac-BarringInfo), to determine whether the UE 315-*b* may be able or allowed to establish a new access attempt and communicate using the ATG network. If the ATG-specific access identities and access categories indicate that the UE 315-*b* may be able or allowed to communicate using the ATG network, the UE 315-*b* may transmit an access request 335-*a* to base station 305 to establish communications. In some cases, the access request 335-*a* may include a random access request of a RACH procedure. However, due to the UE 315-*a* not being configured with, introduced to, or otherwise not having applied the ATG-specific access identities, access categories, or both, the UE 315-*a* may not be able to identify the ATG-specific access identities, access categories, or both, even if SIB 325 and the IE (e.g., uac-BarringInfo) is received. The UE 315-*a* may thus be unable to decode system information for communicating with the base station 305.

Figure 4:
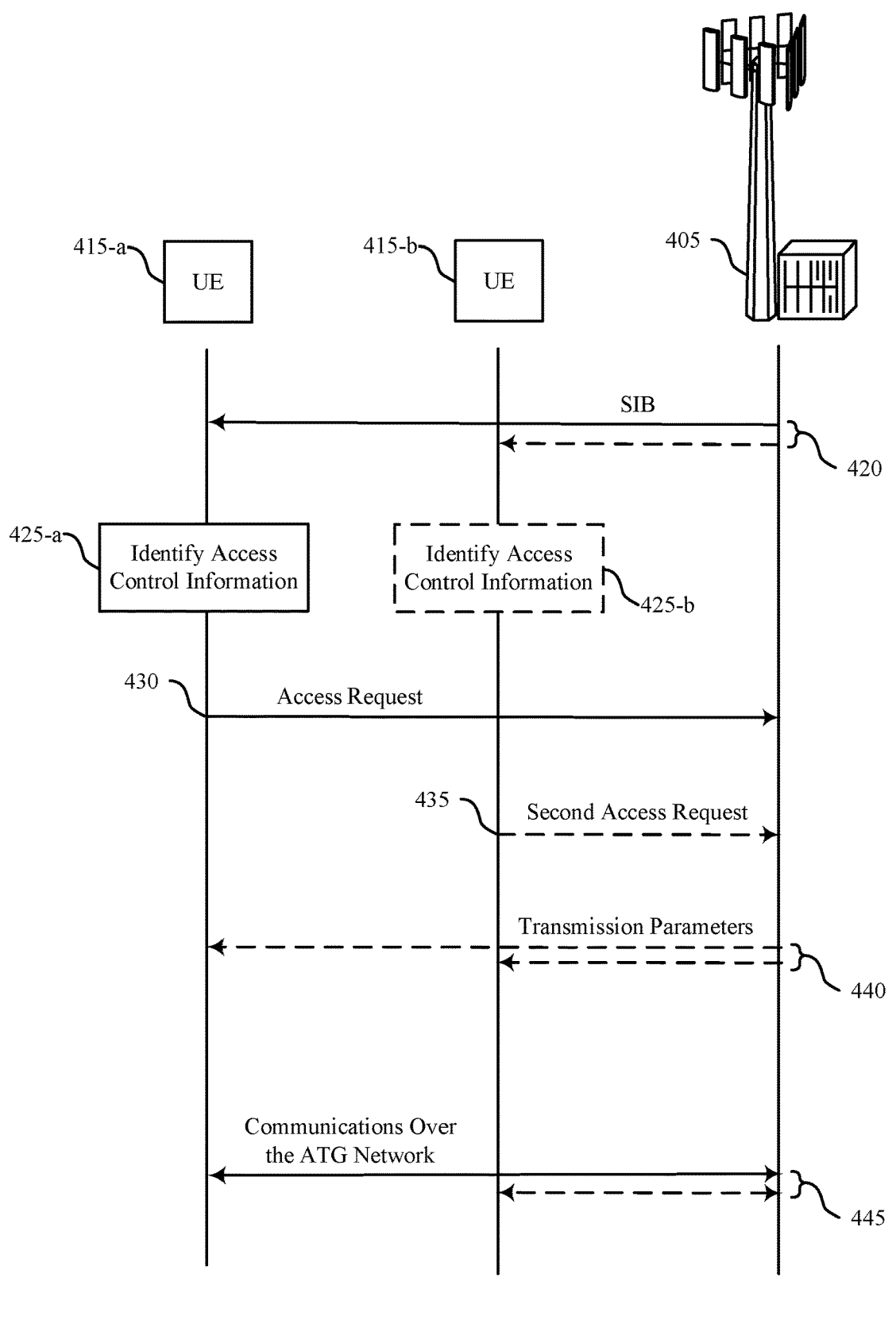
FIG. 4 illustrates an example of a process flow that supports techniques for access control for user equipment in accordance with aspects of the present disclosure.

FIG. 4 illustrates an example of a process flow 400 that supports techniques for access control for user equipment in accordance with aspects of the present disclosure. The process flow 400 may implement or be implemented by aspects of the wireless communications system 100, wireless communications system 200, wireless communications system 300, or a combination of these, as described with reference to FIG. 1, FIG. 2, and FIG. 3. In some examples, the process flow 400 may include example operations associated with a base station 405 and one or more UEs 415, which may be examples of corresponding devices described with reference to FIGS. 1, 2, and 3. In some examples, a UE 415-*a* may be an ATG-UE, and a UE 415-*b* may be a terrestrial UE. In some cases, the base station 405 may transmit or receive communications with a satellite such as the satellite 220, and the satellite 220 may transmit or receive communications with the UE 415-*a*, UE 415-*b*, or both (e.g., where satellite 220 may be an intermediate device for communications between base station 405 and UE 415-*a*). In the following description of the process flow 400, the operations between the base station 405 and the UEs 415 may be performed in a different order than the example order shown, or the operations performed by the base station 405 and the UEs 415 may be performed in different orders or at different times. Some operations may also be omitted from the process flow 400, and other operations may be added to the process flow 400.

At 420, UE 415-*a* may receive, from the base station 405 (e.g., broadcasted from the base station 405 to one or more UEs 415), a SIB including access control information (e.g., UAC barring information) for communications over an ATG wireless communications network. In some examples, the ATG wireless communications network may be configured for aircraft passenger communications, air traffic management, aircraft surveillance, aircraft maintenance, or any combination of these.

At 425-*a*, UE 415-*a* may identify the access control information (e.g., the UAC barring information) in the SIB. In some examples, UE 415-*a* may identify the UAC barring information for the ATG wireless communications network in an IE (e.g., uac-BarringInfo, uac-BarringInfo-ATG, or another IE) in the SIB, where the IE may be dedicated for UEs communicating over the ATG wireless communications network (e.g., uac-BarringInfo-ATG). In some other examples, UE 415-*a* may identify the UAC barring information in one or more IEs (e.g., one or more sub-IEs) of a barring IE (e.g., uac-BarringInfo) in the SIB, where the one or more IEs may be dedicated for UEs communicating over the ATG wireless communications network. In some other examples, UE 415-*a* may identify the UAC barring information based on one or more access identities indicated by the barring IE in the SIB. In some cases, the one or more access identities may be dedicated for UEs communicating over the ATG wireless communications network. In some other examples, UE 415-*a* may identify the UAC barring information based on one or more access categories indicated by the barring IE in the SIB. In some cases, the one or more access categories may be dedicated for UEs communicating over the ATG wireless communications network. In some other examples, UE 415-*a* may identify, in the SIB, second UAC barring information (e.g., in an IE such as uac-BarringInfo, in one or more sub-IEs, based on one or more access identities, based on one or more access categories, or any combination thereof) dedicated for terrestrial wireless devices communicating over the ATG wireless communications network. In some cases, UE 415-*a* may select the UAC barring information or the second UAC barring information to use for accessing the ATG wireless communications network. In some cases, at 425-*b*, the UE 415-*b* may identify the access control information (e.g., the UAC barring information) in the SIB.

At 430, UE 415-*a* may transmit, to the base station 405, in response to receiving the SIB, signaling indicating an access request to establish a communication link with the base station over the ATG wireless communications network. In some examples, the access request may include a random access request of a RACH procedure. In some cases, the access request may be based on the received access control information (e.g., in the IE, or in the one or more IEs, or the one or more access identities, or the one or more access categories, or any combination thereof). In some cases, the access request may be based on selecting the UAC barring information or the second UAC barring information.

At 435, base station 405 may receive, from the UE 415-*b* (e.g., which may be a terrestrial UE), a second access request to establish a second communication link with the base station 405 over the ATG wireless communications network. In some examples, the UE 415-*b* may transmit the signaling based on the second UAC barring information.

At 440, UE 415-*a* may receive, from the base station 405, signaling indicating one or more transmission parameters associated with the ATG wireless communications network. In some cases, the one or more transmission parameters may include a TA value, an SCS, a CP length, or any combination thereof. In some examples, UE 415-*b* may also receive transmission parameters associated with the ATG wireless communications network, which may be the same transmission parameters transmitted to the UE 415-*a*, or different transmission parameters.

At 445, UE 415-*a* may communicate with the base station 405 over the ATG wireless communications network based on the access request. In some examples, the UE 415-*b* may also communicate with the base station 405. The operations performed by the base station 405 and the UEs 415 may support improvements to communications reliability and efficiency, among other benefits.

Figure 5:
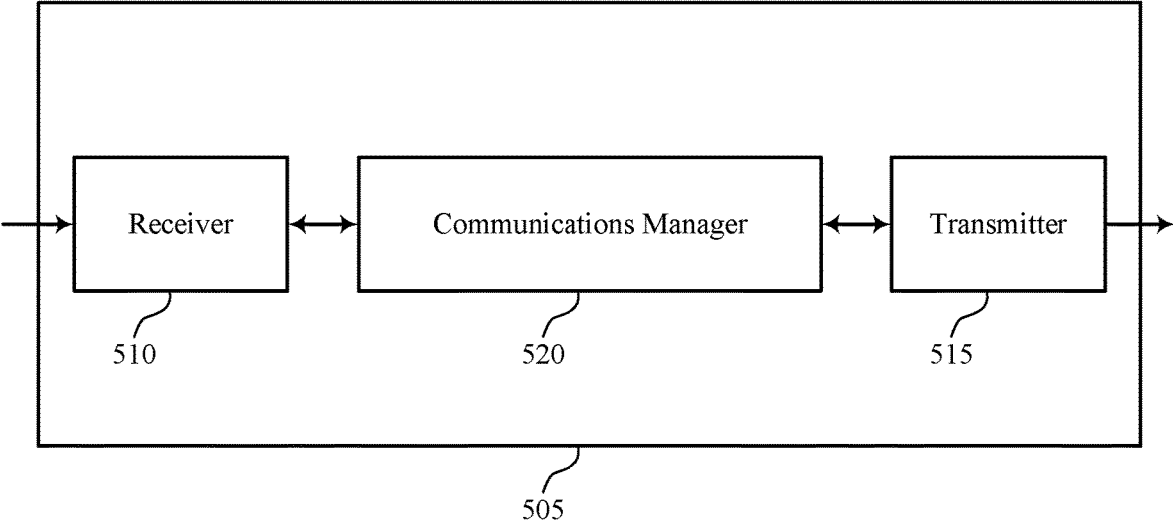
FIGS. 5 and 6 show block diagrams of devices that support techniques for access control for user equipment in accordance with aspects of the present disclosure.

FIG. 5 shows a block diagram 500 of a device 505 that supports techniques for access control for user equipment in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for access control for user equipment). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for access control for user equipment). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for access control for user equipment as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, a SIB including UAC barring information for communications over an ATG wireless communications network. The communications manager 520 may be configured as or otherwise support a means for transmitting, to the base station, signaling based on the receiving of the SIB, the signaling indicating an access request to establish a communication link with the base station over the ATG wireless communications network. The communications manager 520 may be configured as or otherwise support a means for communicating with the base station over the ATG wireless communications network based on the transmitting of the signaling.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources.

Figure 6:
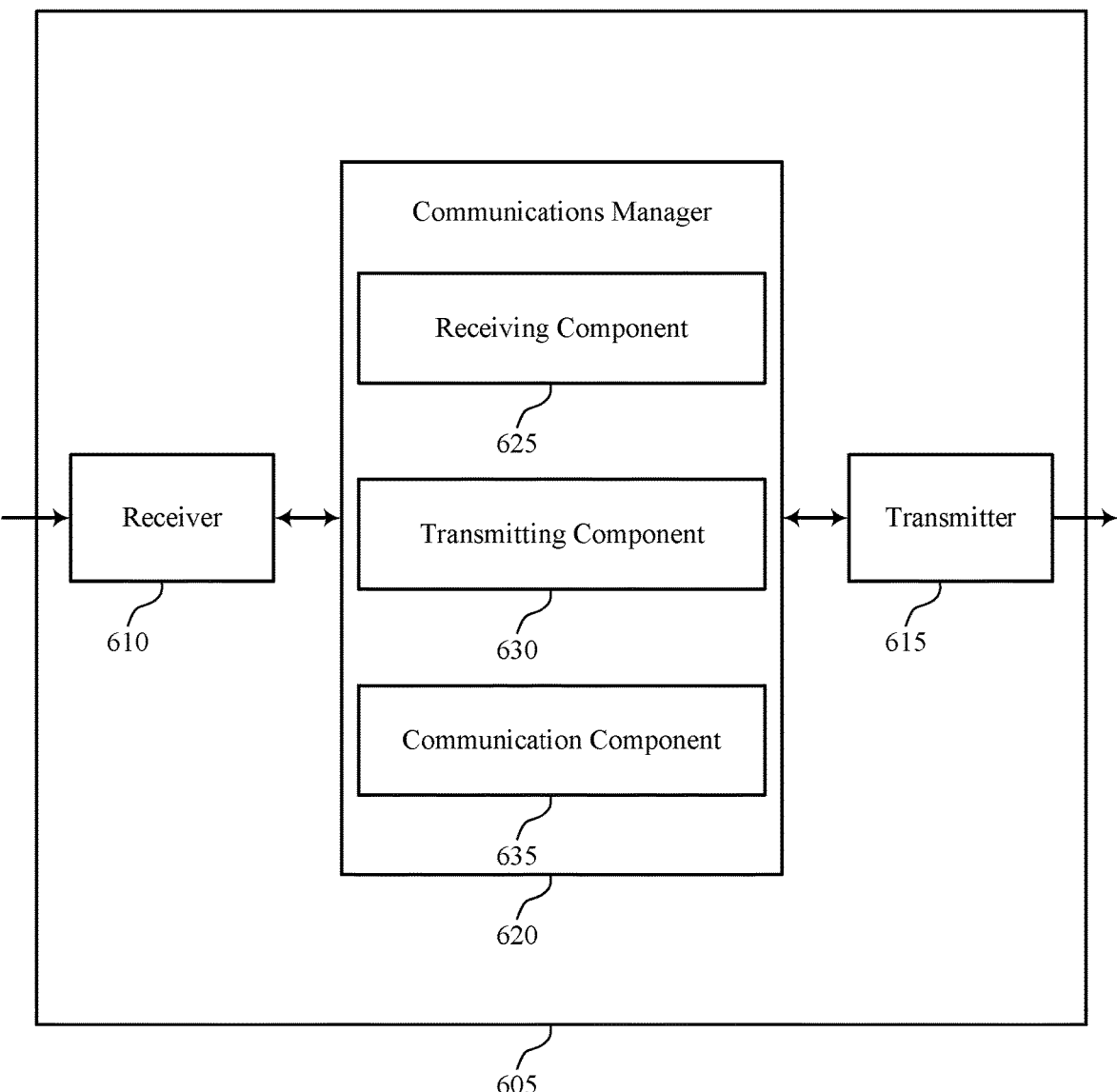

FIG. 6 shows a block diagram 600 of a device 605 that supports techniques for access control for user equipment in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for access control for user equipment). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for access control for user equipment). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for access control for user equipment as described herein. For example, the communications manager 620 may include a receiving component 625, a transmitting component 630, a communication component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The receiving component 625 may be configured as or otherwise support a means for receiving, from a base station, a SIB including UAC barring information for communications over an ATG wireless communications network. The transmitting component 630 may be configured as or otherwise support a means for transmitting, to the base station, signaling based on the receiving of the SIB, the signaling indicating an access request to establish a communication link with the base station over the ATG wireless communications network. The communication component 635 may be configured as or otherwise support a means for communicating with the base station over the ATG wireless communications network based on the transmitting of the signaling.

Figure 7:
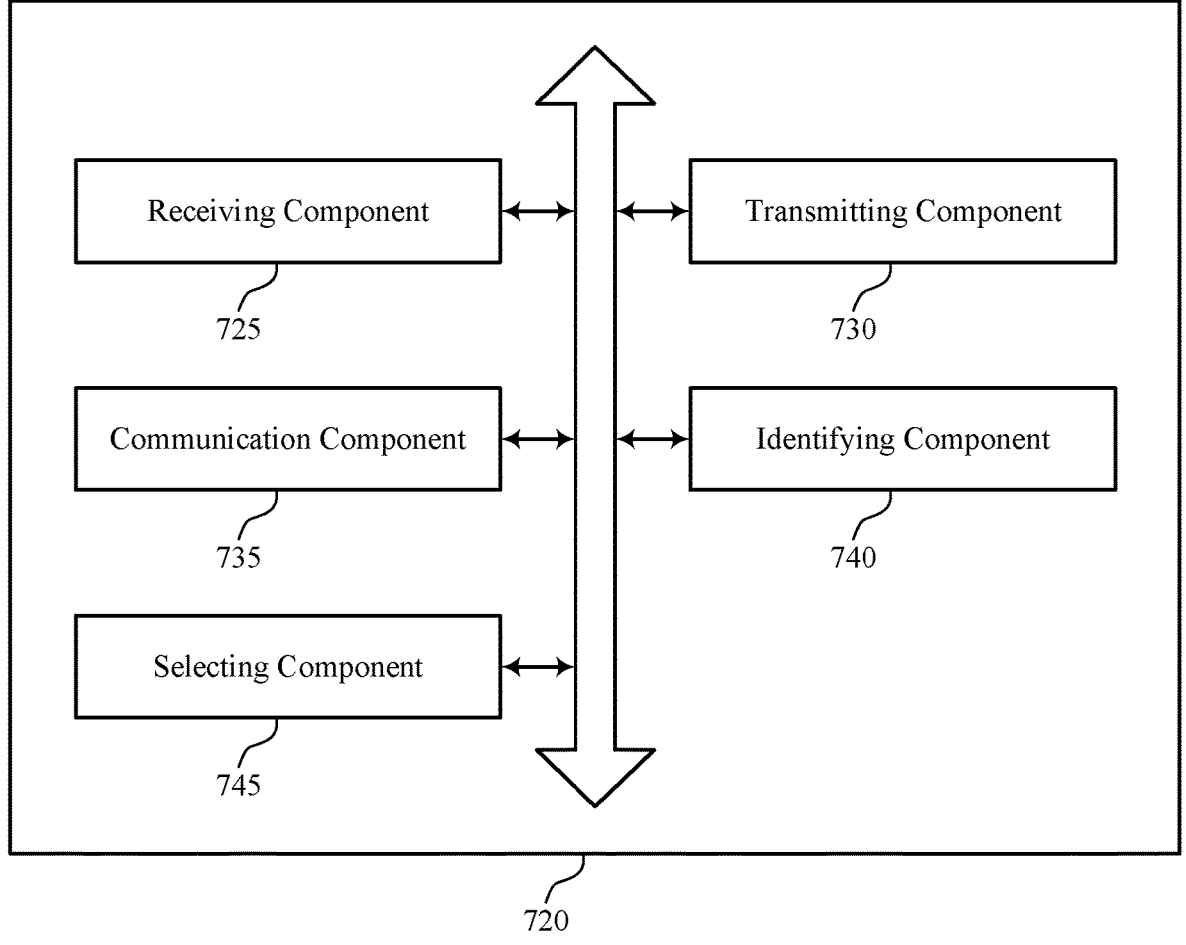
FIG. 7 shows a block diagram of a communications manager that supports techniques for access control for user equipment in accordance with aspects of the present disclosure.

FIG. 7 shows a block diagram 700 of a communications manager 720 that supports techniques for access control for user equipment in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for access control for user equipment as described herein. For example, the communications manager 720 may include a receiving component 725, a transmitting component 730, a communication component 735, an identifying component 740, a selecting component 745, or any combination thereof. Each of these components may communicate, directly or indirectly, with one another (e.g., via one or more buses).

The communications manager 720 may support wireless communications at a UE in accordance with examples as disclosed herein. The receiving component 725 may be configured as or otherwise support a means for receiving, from a base station, a SIB including UAC barring information for communications over an ATG wireless communications network. The transmitting component 730 may be configured as or otherwise support a means for transmitting, to the base station, signaling based on the receiving of the SIB, the signaling indicating an access request to establish a communication link with the base station over the ATG wireless communications network. The communication component 735 may be configured as or otherwise support a means for communicating with the base station over the ATG wireless communications network based on the transmitting of the signaling.

In some examples, the identifying component 740 may be configured as or otherwise support a means for identifying the UAC barring information for the ATG wireless communications network in an IE in the SIB based on the receiving of the SIB, the IE dedicated for UEs communicating over the ATG wireless communications network, where the transmitting of the signaling indicating the access request is based on the identifying of the UAC barring information in the IE.

In some examples, the identifying component 740 may be configured as or otherwise support a means for identifying the UAC barring information in one or more IEs of a barring IE in the SIB based on the receiving of the SIB, the one or more IEs dedicated for UEs communicating over the ATG wireless communications network, where the transmitting of the signaling indicating the access request is based on the identifying of the UAC barring information in the one or more IEs.

In some examples, the identifying component 740 may be configured as or otherwise support a means for identifying the UAC barring information based on one or more access identities indicated by a barring IE in the SIB based on the receiving of the SIB, where the transmitting of the signaling indicating the access request is based on the identifying of the UAC barring information that is based on the one or more access identities.

In some examples, the one or more access identities are dedicated for UEs communicating over the ATG wireless communications network.

In some examples, the identifying component 740 may be configured as or otherwise support a means for identifying the UAC barring information based on one or more access categories indicated by a barring IE in the SIB based on the receiving of the SIB, where the transmitting of the signaling indicating the access request is based on the identifying of the UAC barring information that is based on the one or more access categories.

In some examples, the one or more access categories are dedicated for UEs communicating over the ATG wireless communications network.

In some examples, the identifying component 740 may be configured as or otherwise support a means for identifying, in the SIB, second UAC barring information dedicated for terrestrial wireless devices communicating over the ATG wireless communications network, where the transmitting of the signaling indicating the access request is based on the identifying of the second UAC barring information.

In some examples, the selecting component 745 may be configured as or otherwise support a means for selecting the UAC barring information or the second UAC barring information to use for accessing the ATG wireless communications network, where the transmitting of the signaling indicating the access request is based on the selecting of the UAC barring information or the second UAC barring information.

In some examples, the receiving component 725 may be configured as or otherwise support a means for receiving, from the base station, second signaling indicating one or more transmission parameters associated with the ATG wireless communications network, where the communicating with the base station is further based on the receiving of the second signaling.

In some examples, the one or more transmission parameters include a TA value, an SCS, a CP length, or any combination thereof.

In some examples, the access request includes a random access request of a RACH procedure.

In some examples, the ATG wireless communications network is configured for aircraft passenger communications, air traffic management, aircraft surveillance, aircraft maintenance, or any combination thereof.

Figure 8:
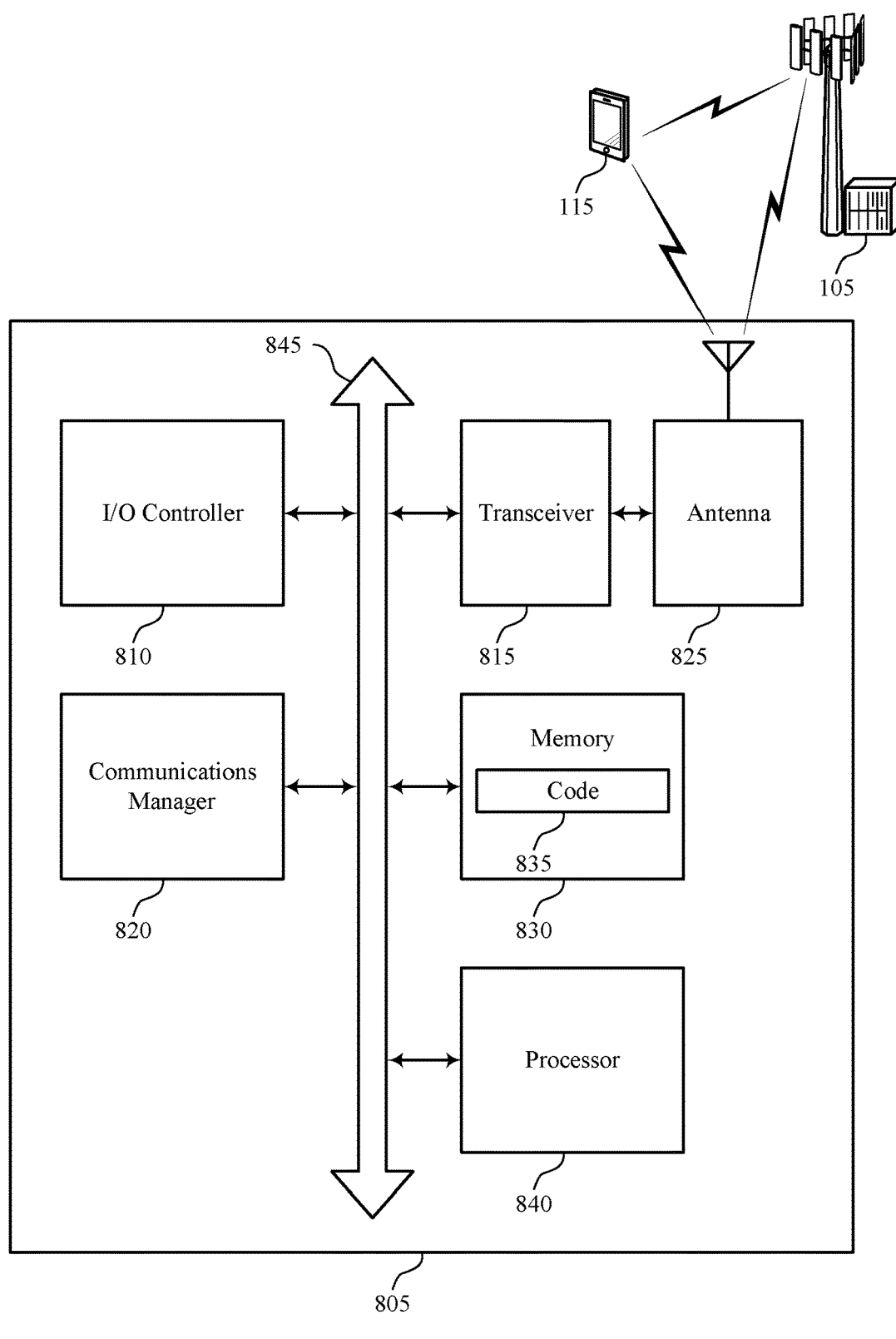
FIG. 8 shows a diagram of a system including a device that supports techniques for access control for user equipment in accordance with aspects of the present disclosure.

FIG. 8 shows a diagram of a system 800 including a device 805 that supports techniques for access control for user equipment in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for access control for user equipment). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, a SIB including UAC barring information for communications over an ATG wireless communications network. The communications manager 820 may be configured as or otherwise support a means for transmitting, to the base station, signaling based on the receiving of the SIB, the signaling indicating an access request to establish a communication link with the base station over the ATG wireless communications network. The communications manager 820 may be configured as or otherwise support a means for communicating with the base station over the ATG wireless communications network based on the transmitting of the signaling.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for access control for user equipment as described herein, or the processor 840 and the memory 830 may be otherwise configured to perform or support such operations.

Figure 9:
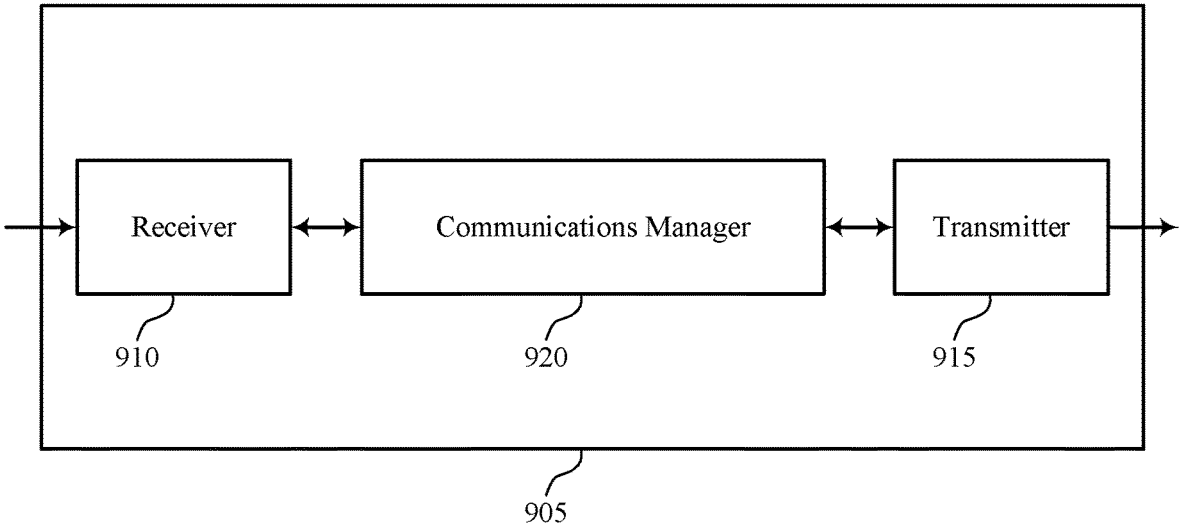
FIGS. 9 and 10 show block diagrams of devices that support techniques for access control for user equipment in accordance with aspects of the present disclosure.

FIG. 9 shows a block diagram 900 of a device 905 that supports techniques for access control for user equipment in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for access control for user equipment). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for access control for user equipment). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for access control for user equipment as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for broadcasting a SIB including UAC barring information for communications over an ATG wireless communications network. The communications manager 920 may be configured as or otherwise support a means for receiving, from a UE, signaling based on the broadcasting of the SIB, the signaling indicating an access request to establish a communication link with the base station over the ATG wireless communications network. The communications manager 920 may be configured as or otherwise support a means for communicating with the UE over the ATG wireless communications network based on the receiving of the signaling.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, and more efficient utilization of communication resources.

Figure 10:
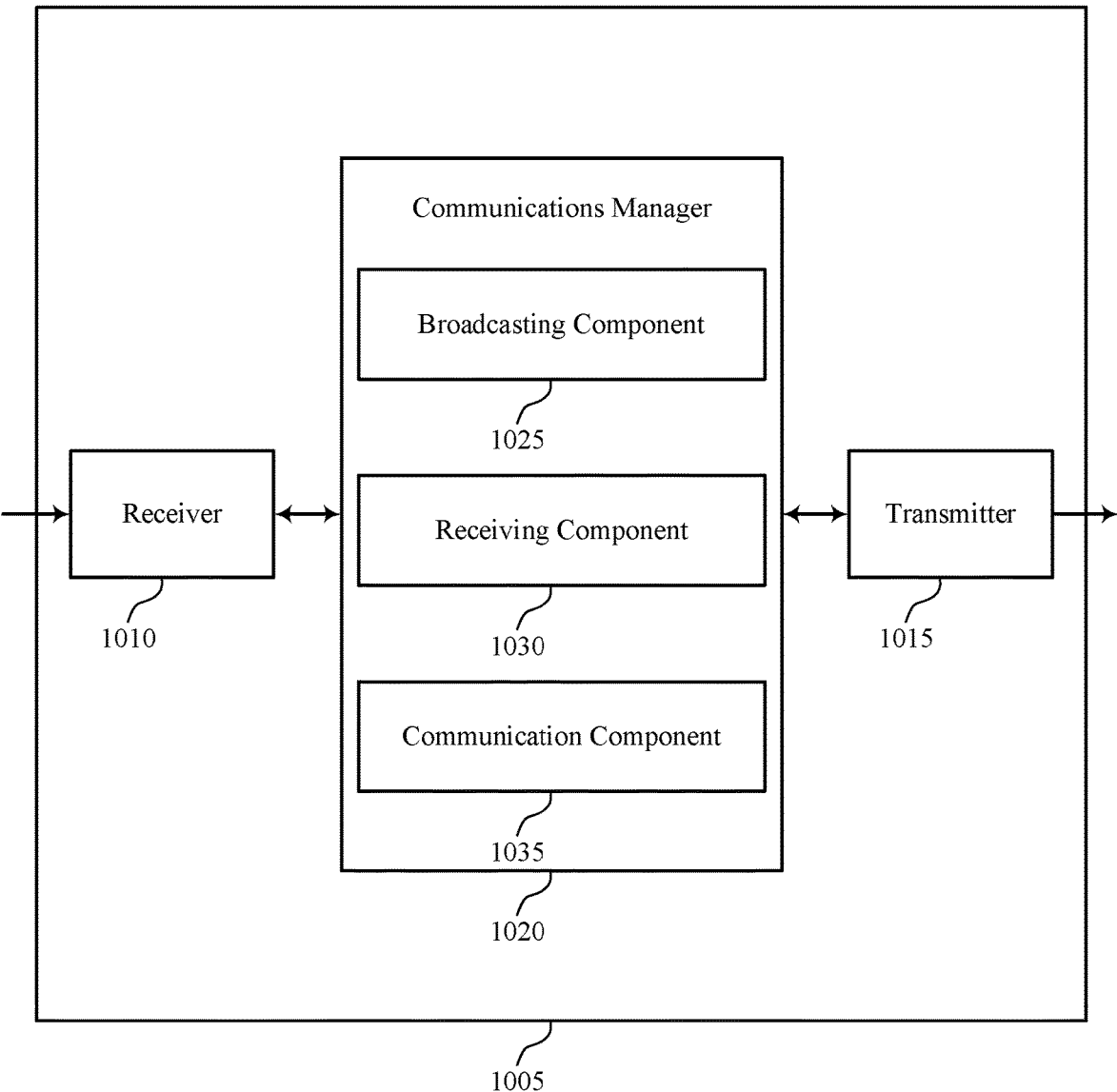

FIG. 10 shows a block diagram 1000 of a device 1005 that supports techniques for access control for user equipment in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for access control for user equipment). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for access control for user equipment). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for access control for user equipment as described herein. For example, the communications manager 1020 may include a broadcasting component 1025, a receiving component 1030, a communication component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The broadcasting component 1025 may be configured as or otherwise support a means for broadcasting a SIB including UAC barring information for communications over an ATG wireless communications network. The receiving component 1030 may be configured as or otherwise support a means for receiving, from a UE, signaling based on the broadcasting of the SIB, the signaling indicating an access request to establish a communication link with the base station over the ATG wireless communications network. The communication component 1035 may be configured as or otherwise support a means for communicating with the UE over the ATG wireless communications network based on the receiving of the signaling.

Figure 11:
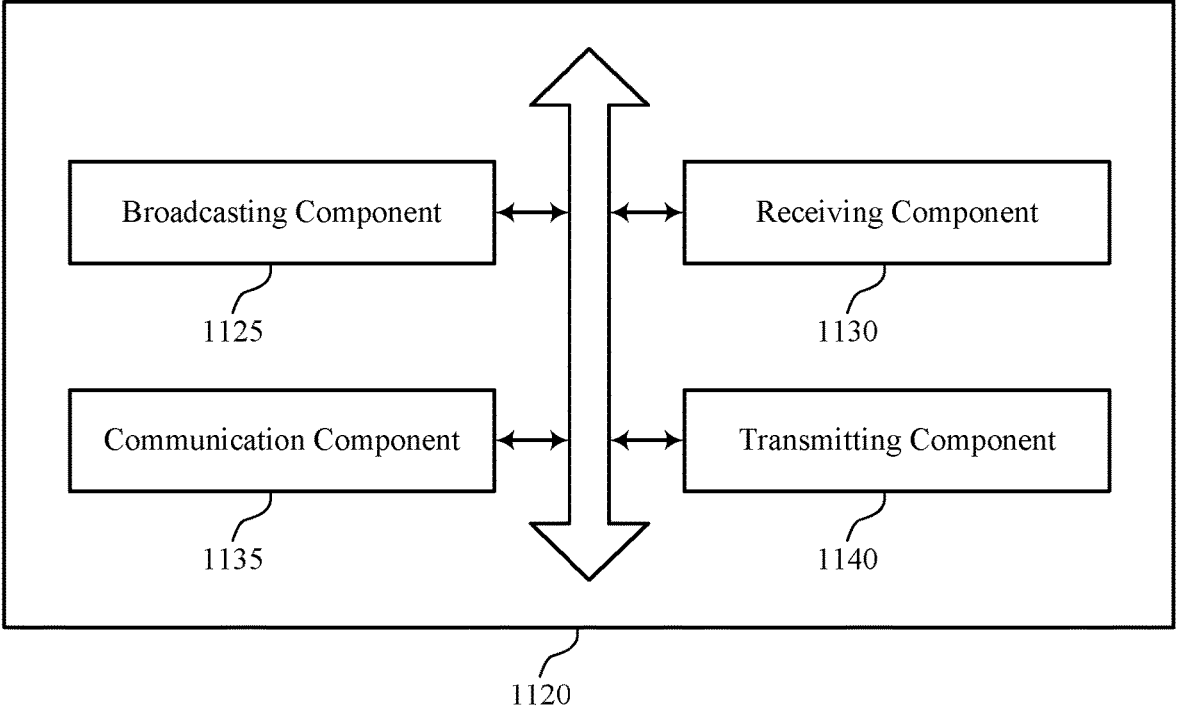
FIG. 11 shows a block diagram of a communications manager that supports techniques for access control for user equipment in accordance with aspects of the present disclosure.

FIG. 11 shows a block diagram 1100 of a communications manager 1120 that supports techniques for access control for user equipment in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for access control for user equipment as described herein. For example, the communications manager 1120 may include a broadcasting component 1125, a receiving component 1130, a communication component 1135, a transmitting component 1140, or any combination thereof. Each of these components may communicate, directly or indirectly, with one another (e.g., via one or more buses).

The communications manager 1120 may support wireless communications at a base station in accordance with examples as disclosed herein. The broadcasting component 1125 may be configured as or otherwise support a means for broadcasting a SIB including UAC barring information for communications over an ATG wireless communications network. The receiving component 1130 may be configured as or otherwise support a means for receiving, from a UE, signaling based on the broadcasting of the SIB, the signaling indicating an access request to establish a communication link with the base station over the ATG wireless communications network. The communication component 1135 may be configured as or otherwise support a means for communicating with the UE over the ATG wireless communications network based on the receiving of the signaling.

In some examples, to support broadcasting of the SIB, the broadcasting component 1125 may be configured as or otherwise support a means for broadcasting the UAC barring information for the ATG wireless communications network in an IE in the SIB, the IE dedicated for UEs communicating over the ATG wireless communications network, where the receiving of the signaling indicating the access request is based on the broadcasting of the UAC barring information in the IE.

In some examples, to support broadcasting of the SIB, the broadcasting component 1125 may be configured as or otherwise support a means for broadcasting the UAC barring information in one or more IEs of a barring IE in the SIB, the one or more IEs dedicated for UEs communicating over the ATG wireless communications network, where the receiving of the signaling indicating the access request is based on the broadcasting of the UAC barring information in the one or more IEs.

In some examples, to support broadcasting of the SIB, the broadcasting component 1125 may be configured as or otherwise support a means for broadcasting, in the SIB one or more access identities in a barring IE, the one or more access identities associated with the UAC barring information, where the receiving of the signaling indicating the access request is based on the broadcasting of the one or more access identities.

In some examples, the one or more access identities are dedicated for UEs communicating over the ATG wireless communications network.

In some examples, to support broadcasting of the SIB, the broadcasting component 1125 may be configured as or otherwise support a means for broadcasting, in the SIB one or more access categories in a barring IE, the one or more access categories associated with the UAC barring information, where the receiving of the signaling indicating the access request is based on the broadcasting of the one or more access categories.

In some examples, the one or more access categories are dedicated for UEs communicating over the ATG wireless communications network.

In some examples, to support broadcasting of the SIB, the broadcasting component 1125 may be configured as or otherwise support a means for broadcasting, in the SIB, second UAC barring information dedicated for terrestrial wireless devices communicating over the ATG wireless communications network, where the broadcasting of the second UAC barring information is based on a congestion metric at the base station, a time of day, or both.

In some examples, the receiving component 1130 may be configured as or otherwise support a means for receiving, from a second UE, second signaling based on the broadcasting of the second UAC barring information, the second signaling indicating a second access request to establish a second communication link with the base station over the ATG wireless communications network. In some examples, the communication component 1135 may be configured as or otherwise support a means for communicating with the second UE over the ATG wireless communications network based on the receiving of the second signaling.

In some examples, the transmitting component 1140 may be configured as or otherwise support a means for transmitting, to the UE, second signaling indicating one or more transmission parameters associated with the ATG wireless communications network, where the communicating with the UE is further based on the transmitting of the second signaling.

In some examples, the one or more transmission parameters include a TA value, an SCS, a CP length, or any combination thereof.

In some examples, the access request includes a random access request of a RACH procedure.

In some examples, the ATG wireless communications network is configured for aircraft passenger communications, air traffic management, aircraft surveillance, aircraft maintenance, or any combination thereof.

Figure 12:
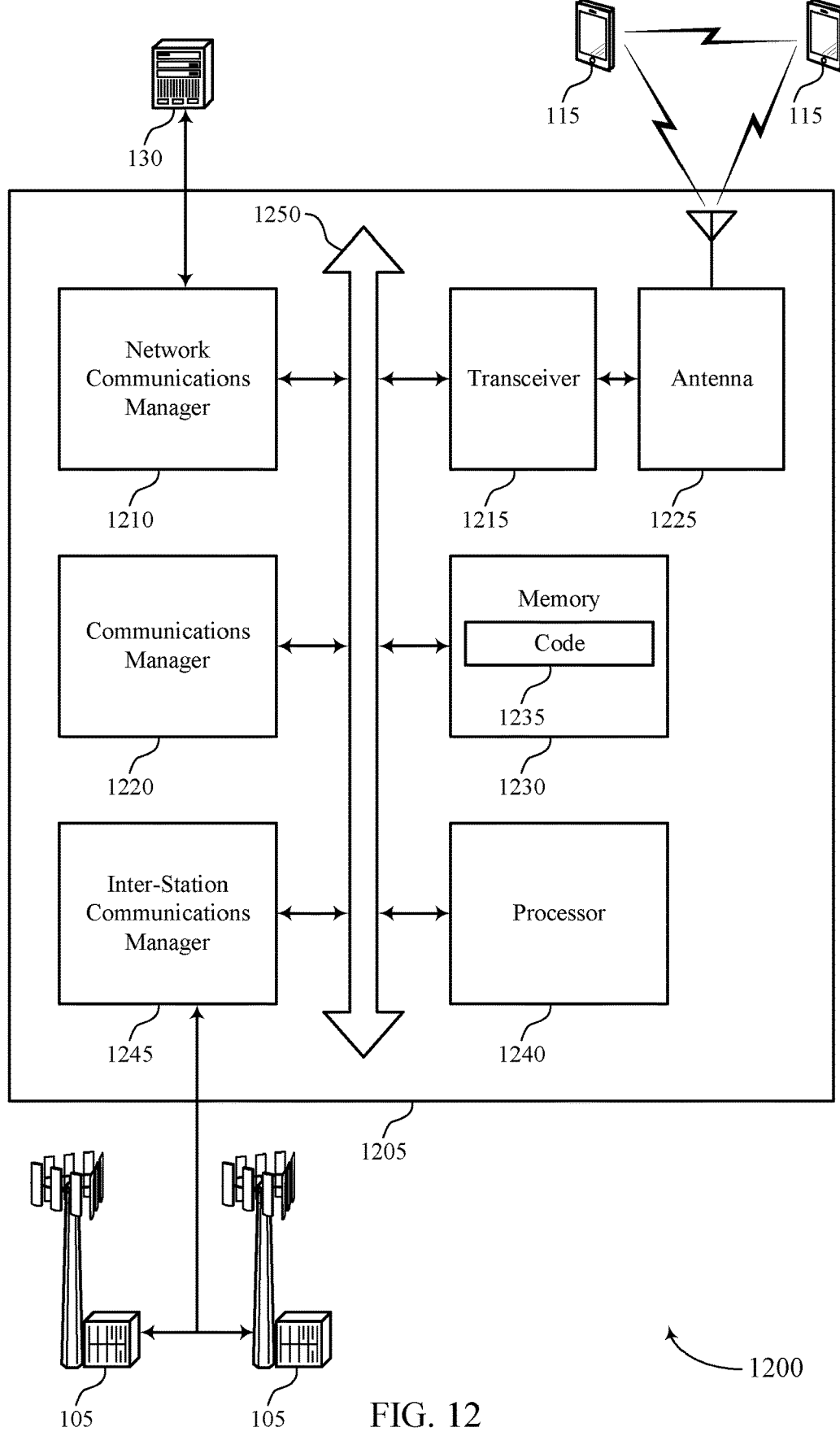
FIG. 12 shows a diagram of a system including a device that supports techniques for access control for user equipment in accordance with aspects of the present disclosure.

FIG. 12 shows a diagram of a system 1200 including a device 1205 that supports techniques for access control for user equipment in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory.

In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for access control for user equipment). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for broadcasting a SIB including UAC barring information for communications over an ATG wireless communications network. The communications manager 1220 may be configured as or otherwise support a means for receiving, from a UE, signaling based on the broadcasting of the SIB, the signaling indicating an access request to establish a communication link with the base station over the ATG wireless communications network. The communications manager 1220 may be configured as or otherwise support a means for communicating with the UE over the ATG wireless communications network based on the receiving of the signaling.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for access control for user equipment as described herein, or the processor 1240 and the memory 1230 may be otherwise configured to perform or support such operations.

FIG. 13 shows a flowchart illustrating a method 1300 that supports techniques for access control for user equipment in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a SIB including UAC barring information for communications over an ATG wireless communications network. The operations of 1305 may be performed in accordance with examples as disclosed herein. In some examples, aspects of the operations of 1305 may be performed by a receiving component 725 as described with reference to FIG. 7.

At 1310, the method may include transmitting, to the base station, signaling based on the receiving of the SIB, the signaling indicating an access request to establish a communication link with the base station over the ATG wireless communications network. The operations of 1310 may be performed in accordance with examples as disclosed herein. In some examples, aspects of the operations of 1310 may be performed by a transmitting component 730 as described with reference to FIG. 7.

At 1315, the method may include communicating with the base station over the ATG wireless communications network based on the transmitting of the signaling. The operations of 1315 may be performed in accordance with examples as disclosed herein. In some examples, aspects of the operations of 1315 may be performed by a communication component 735 as described with reference to FIG. 7.

FIG. 14 shows a flowchart illustrating a method 1400 that supports techniques for access control for user equipment in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a SIB including UAC barring information for communications over an ATG wireless communications network. The operations of 1405 may be performed in accordance with examples as disclosed herein. In some examples, aspects of the operations of 1405 may be performed by a receiving component 725 as described with reference to FIG. 7.

At 1410, the method may include identifying the UAC barring information for the ATG wireless communications network in an IE in the SIB based on the receiving of the SIB, the IE dedicated for UEs communicating over the ATG wireless communications network. The operations of 1410 may be performed in accordance with examples as disclosed herein. In some examples, aspects of the operations of 1410 may be performed by an identifying component 740 as described with reference to FIG. 7.

At 1415, the method may include transmitting, to the base station, signaling based on the receiving of the SIB and the identifying of the UAC barring information in the IE, the signaling indicating an access request to establish a communication link with the base station over the ATG wireless communications network. The operations of 1415 may be performed in accordance with examples as disclosed herein. In some examples, aspects of the operations of 1415 may be performed by a transmitting component 730 as described with reference to FIG. 7.

At 1420, the method may include communicating with the base station over the ATG wireless communications network based on the transmitting of the signaling. The operations of 1420 may be performed in accordance with examples as disclosed herein. In some examples, aspects of the operations of 1420 may be performed by a communication component 735 as described with reference to FIG. 7.

FIG. 15 shows a flowchart illustrating a method 1500 that supports techniques for access control for user equipment in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a SIB including UAC barring information for communications over an ATG wireless communications network. The operations of 1505 may be performed in accordance with examples as disclosed herein. In some examples, aspects of the operations of 1505 may be performed by a receiving component 725 as described with reference to FIG. 7.

At 1510, the method may include identifying the UAC barring information in one or more IEs of a barring IE in the SIB based on the receiving of the SIB, the one or more IEs dedicated for UEs communicating over the ATG wireless communications network. The operations of 1510 may be performed in accordance with examples as disclosed herein. In some examples, aspects of the operations of 1510 may be performed by an identifying component 740 as described with reference to FIG. 7.

At 1515, the method may include transmitting, to the base station, signaling based on the receiving of the SIB and the identifying of the UAC barring information in the IE, the signaling indicating an access request to establish a communication link with the base station over the ATG wireless communications network. The operations of 1515 may be performed in accordance with examples as disclosed herein. In some examples, aspects of the operations of 1515 may be performed by a transmitting component 730 as described with reference to FIG. 7.

At 1520, the method may include communicating with the base station over the ATG wireless communications network based on the transmitting of the signaling. The operations of 1520 may be performed in accordance with examples as disclosed herein. In some examples, aspects of the operations of 1520 may be performed by a communication component 735 as described with reference to FIG. 7.

FIG. 16 shows a flowchart illustrating a method 1600 that supports techniques for access control for user equipment in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a SIB including UAC barring information for communications over an ATG wireless communications network. The operations of 1605 may be performed in accordance with examples as disclosed herein. In some examples, aspects of the operations of 1605 may be performed by a receiving component 725 as described with reference to FIG. 7.

At 1610, the method may include identifying the UAC barring information based on one or more access identities or one or more access categories indicated by a barring IE in the SIB based on the receiving of the SIB. The operations of 1610 may be performed in accordance with examples as disclosed herein. In some examples, aspects of the operations of 1610 may be performed by an identifying component 740 as described with reference to FIG. 7.

At 1615, the method may include transmitting, to the base station, signaling based on the receiving of the SIB and the identifying of the UAC barring information, the signaling indicating an access request to establish a communication link with the base station over the ATG wireless communications network. The operations of 1615 may be performed in accordance with examples as disclosed herein. In some examples, aspects of the operations of 1615 may be performed by a transmitting component 730 as described with reference to FIG. 7.

At 1620, the method may include communicating with the base station over the ATG wireless communications network based on the transmitting of the signaling. The operations of 1620 may be performed in accordance with examples as disclosed herein. In some examples, aspects of the operations of 1620 may be performed by a communication component 735 as described with reference to FIG. 7.

FIG. 17 shows a flowchart illustrating a method 1700 that supports techniques for access control for user equipment in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include broadcasting a SIB including UAC barring information for communications over an ATG wireless communications network. The operations of 1705 may be performed in accordance with examples as disclosed herein. In some examples, aspects of the operations of 1705 may be performed by a broadcasting component 1125 as described with reference to FIG. 11.

At 1710, the method may include receiving, from a UE, signaling based on the broadcasting of the SIB, the signaling indicating an access request to establish a communication link with the base station over the ATG wireless communications network. The operations of 1710 may be performed in accordance with examples as disclosed herein. In some examples, aspects of the operations of 1710 may be performed by a receiving component 1130 as described with reference to FIG. 11.

At 1715, the method may include communicating with the UE over the ATG wireless communications network based on the receiving of the signaling. The operations of 1715 may be performed in accordance with examples as disclosed herein. In some examples, aspects of the operations of 1715 may be performed by a communication component 1135 as described with reference to FIG. 11.

The following provides an overview of aspects of the present disclosure:

Aspect 1: A method for wireless communications at a UE, comprising: receiving, from a base station, a SIB comprising UAC barring information for communications over an ATG wireless communications network; transmitting, to the base station, signaling based at least in part on the receiving of the SIB, the signaling indicating an access request to establish a communication link with the base station over the ATG wireless communications network; and communicating with the base station over the ATG wireless communications network based at least in part on the transmitting of the signaling.

Aspect 2: The method of aspect 1, further comprising: identifying the UAC barring information for the ATG wireless communications network in an IE in the SIB based at least in part on the receiving of the SIB, the IE dedicated for UEs communicating over the ATG wireless communications network, wherein the transmitting of the signaling indicating the access request is based at least in part on the identifying of the UAC barring information in the IE.

Aspect 3: The method of any of aspects 1 through 2, further comprising: identifying the UAC barring information in one or more IEs of a barring IE in the SIB based at least in part on the receiving of the SIB, the one or more IEs dedicated for UEs communicating over the ATG wireless communications network, wherein the transmitting of the signaling indicating the access request is based at least in part on the identifying of the UAC barring information in the one or more IEs.

Aspect 4: The method of any of aspects 1 through 3, further comprising: identifying the UAC barring information based at least in part on one or more access identities indicated by a barring IE in the SIB based at least in part on the receiving of the SIB, wherein the transmitting of the signaling indicating the access request is based at least in part on the identifying of the UAC barring information that is based at least in part on the one or more access identities.

Aspect 5: The method of aspect 4, wherein the one or more access identities are dedicated for UEs communicating over the ATG wireless communications network.

Aspect 6: The method of any of aspects 1 through 5, further comprising: identifying the UAC barring information based at least in part on one or more access categories indicated by a barring IE in the SIB based at least in part on the receiving of the SIB, wherein the transmitting of the signaling indicating the access request is based at least in part on the identifying of the UAC barring information that is based at least in part on the one or more access categories.

Aspect 7: The method of aspect 6, wherein the one or more access categories are dedicated for UEs communicating over the ATG wireless communications network.

Aspect 8: The method of any of aspects 1 through 7, further comprising: identifying, in the SIB, second UAC barring information dedicated for terrestrial wireless devices communicating over the ATG wireless communications network, wherein the transmitting of the signaling indicating the access request is based at least in part on the identifying of the second UAC barring information.

Aspect 9: The method of aspect 8, further comprising: selecting the UAC barring information or the second UAC barring information to use for accessing the ATG wireless communications network, wherein the transmitting of the signaling indicating the access request is based at least in part on the selecting of the UAC barring information or the second UAC barring information.

Aspect 10: The method of any of aspects 1 through 9, further comprising: receiving, from the base station, second signaling indicating one or more transmission parameters associated with the ATG wireless communications network, wherein the communicating with the base station is further based at least in part on the receiving of the second signaling.

Aspect 11: The method of aspect 10, wherein the one or more transmission parameters comprise a TA value, an SCS, a CP length, or any combination thereof.

Aspect 12: The method of any of aspects 1 through 11, wherein the access request comprises a random access request of a RACH procedure.

Aspect 13: The method of any of aspects 1 through 12, wherein the ATG wireless communications network is configured for aircraft passenger communications, air traffic management, aircraft surveillance, aircraft maintenance, or any combination thereof.

Aspect 14: A method for wireless communications at a base station, comprising: broadcasting a SIB comprising UAC barring information for communications over an ATG wireless communications network; receiving, from a UE, signaling based at least in part on the broadcasting of the SIB, the signaling indicating an access request to establish a communication link with the base station over the ATG wireless communications network; and communicating with the UE over the ATG wireless communications network based at least in part on the receiving of the signaling.

Aspect 15: The method of aspect 14, wherein the broadcasting of the SIB comprises: broadcasting the UAC barring information for the ATG wireless communications network in an IE in the SIB, the IE dedicated for UEs communicating over the ATG wireless communications network, wherein the receiving of the signaling indicating the access request is based at least in part on the broadcasting of the UAC barring information in the IE.

Aspect 16: The method of any of aspects 14 through 15, wherein the broadcasting of the SIB comprises: broadcasting the UAC barring information in one or more IEs of a barring IE in the SIB, the one or more IEs dedicated for UEs communicating over the ATG wireless communications network, wherein the receiving of the signaling indicating the access request is based at least in part on the broadcasting of the UAC barring information in the one or more IEs.

Aspect 17: The method of any of aspects 14 through 16, wherein the broadcasting of the SIB comprises: broadcasting, in the SIB one or more access identities in a barring IE, the one or more access identities associated with the UAC barring information, wherein the receiving of the signaling indicating the access request is based at least in part on the broadcasting of the one or more access identities.

Aspect 18: The method of aspect 17, wherein the one or more access identities are dedicated for UEs communicating over the ATG wireless communications network.

Aspect 19: The method of any of aspects 14 through 18, wherein the broadcasting of the SIB comprises: broadcasting, in the SIB one or more access categories in a barring IE, the one or more access categories associated with the UAC barring information, wherein the receiving of the signaling indicating the access request is based at least in part on the broadcasting of the one or more access categories.

Aspect 20: The method of aspect 19, wherein the one or more access categories are dedicated for UEs communicating over the ATG wireless communications network.

Aspect 21: The method of any of aspects 14 through 20, wherein the broadcasting of the SIB comprises: broadcasting, in the SIB, second UAC barring information dedicated for terrestrial wireless devices communicating over the ATG wireless communications network, wherein the broadcasting of the second UAC barring information is based at least in part on a congestion metric at the base station, a time of day, or both.

Aspect 22: The method of aspect 21, further comprising: receiving, from a second UE, second signaling based at least in part on the broadcasting of the second UAC barring information, the second signaling indicating a second access request to establish a second communication link with the base station over the ATG wireless communications network; and communicating with the second UE over the ATG wireless communications network based at least in part on the receiving of the second signaling.

Aspect 23: The method of any of aspects 14 through 22, further comprising: transmitting, to the UE, second signaling indicating one or more transmission parameters associated with the ATG wireless communications network, wherein the communicating with the UE is further based at least in part on the transmitting of the second signaling.

Aspect 24: The method of aspect 23, wherein the one or more transmission parameters comprise a TA value, an SCS, a CP length, or any combination thereof.

Aspect 25: The method of any of aspects 14 through 24, wherein the access request comprises a random access request of a RACH procedure.

Aspect 26: The method of any of aspects 14 through 25, wherein the ATG wireless communications network is configured for aircraft passenger communications, air traffic management, aircraft surveillance, aircraft maintenance, or any combination thereof.

Aspect 27: An apparatus for wireless communications at a UE, comprising a processor; memory coupled with the processor; and instructions stored in the memory and executable by the processor to cause the apparatus to perform a method of any of aspects 1 through 13.

Aspect 28: An apparatus for wireless communications at a UE, comprising at least one means for performing a method of any of aspects 1 through 13.

Aspect 29: A non-transitory computer-readable medium storing code for wireless communications at a UE, the code comprising instructions executable by a processor to perform a method of any of aspects 1 through 13.

Aspect 30: An apparatus for wireless communications at a base station, comprising a processor; memory coupled with the processor; and instructions stored in the memory and executable by the processor to cause the apparatus to perform a method of any of aspects 14 through 26.

Aspect 31: An apparatus for wireless communications at a base station, comprising at least one means for performing a method of any of aspects 14 through 26.

Aspect 32: A non-transitory computer-readable medium storing code for wireless communications at a base station, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications, comprising:

a transceiver;

a processor;

memory coupled with the processor; and instructions stored in the memory and operable, when executed by the processor, to cause the apparatus to:

receive, from a base station via the transceiver, a system information block comprising unified access control barring information for communications over an air-to-ground wireless communications network;

identify the unified access control barring information in an information element of the system information block, the information element being dedicated for UEs communicating over the air-to-ground wireless communications network;

transmit, to the base station via the transceiver, signaling based at least in part on the receiving of the system information block, the signaling indicating an access request to establish a communication link with the base station over the air-to-ground wireless communications network, wherein the transmitting of the signaling indicating the access request is based at least in part on the identifying of the unified access control barring information in the information element; and communicate, via the transceiver, with the base station over the air-to-ground wireless communications network based at least in part on the transmitting of the signaling.

2. The apparatus of claim 1, wherein the instructions are further executable by the processor to cause the apparatus to:

receive, from the base station via the transceiver, second signaling indicating one or more transmission parameters associated with the air-to-ground wireless communications network, wherein the communicating with the base station is further based at least in part on the receiving of the second signaling.

3. The apparatus of claim 2, wherein the one or more transmission parameters comprise a timing advance value, a subcarrier spacing, a cyclic prefix length, or any combination thereof.

4. The apparatus of claim 1, wherein the access request comprises a random access request of a random access channel procedure.

5. The apparatus of claim 1, wherein the air-to-ground wireless communications network is configured for aircraft passenger communications, air traffic management, aircraft surveillance, aircraft maintenance, or any combination thereof.

6. An apparatus for wireless communications, comprising:

a transceiver;

a processor;

memory coupled with the processor; and instructions stored in the memory and operable, when executed by the processor, to cause the apparatus to:

broadcast, via the transceiver, a system information block comprising unified access control barring information for communications over an air-to-ground wireless communications network, the unified access control barring information being broadcasted in an information element of the system information block, the information element being dedicated for UEs communicating over the air-to-ground wireless communications network;

receive, from a user equipment (UE) via the transceiver, signaling based at least in part on the broadcasting of the system information block, the signaling indicating an access request to establish a communication link with the apparatus over the air-to-ground wireless communications network, wherein the receiving of the signaling indicating the access request is based at least in part on the broadcasting of the unified access control barring information in the information element; and communicate, via the transceiver, with the UE over the air-to-ground wireless communications network based at least in part on the receiving of the signaling.

7. The apparatus of claim 6, wherein the instructions are further executable by the processor to cause the apparatus to:

transmit, to the UE via the transceiver, second signaling indicating one or more transmission parameters associated with the air-to-ground wireless communications network, wherein the communicating with the UE is further based at least in part on the transmitting of the second signaling.

8. The apparatus of claim 7, wherein the one or more transmission parameters comprise a timing advance value, a subcarrier spacing, a cyclic prefix length, or any combination thereof.

9. The apparatus of claim 6, wherein the access request comprises a random access request of a random access channel procedure.

10. The apparatus of claim 6, wherein the air-to-ground wireless communications network is configured for aircraft passenger communications, air traffic management, aircraft surveillance, aircraft maintenance, or any combination thereof.

11. An apparatus for wireless communications:

a transceiver;

a processor;

memory coupled with the processor; and instructions stored in the memory and operable, when executed by the processor, to cause the apparatus to:

receive, from a base station via the transceiver, a system information block comprising unified access control barring information for communications over an air-to-ground wireless communications network;

identify the unified access control barring information in one or more information elements of a barring information element in the system information block, the one or more information elements being dedicated for UEs communicating over the air-to-ground wireless communications network;

transmit, to the base station via the transceiver, signaling based at least in part on the receiving of the system information block, the signaling indicating an access request to establish a communication link with the base station over the air-to-ground wireless communications network, wherein the transmitting of the signaling indicating the access request is based at least in part on the identifying of the unified access control barring information in the one or more information elements; and communicate, via the transceiver, with the base station over the air-to-ground wireless communications network based at least in part on the transmitting of the signaling.

12. An apparatus for wireless communications:

a transceiver;

a processor;

memory coupled with the processor; and instructions stored in the memory and operable, when executed by the processor, to cause the apparatus to:

receive, from a base station via the transceiver, a system information block comprising unified access control barring information for communications over an air-to-ground wireless communications network;

identify the unified access control barring information based at least in part on one or more access identities indicated by a barring information element in the system information block or one or more access categories indicated by the barring information element in the system information block;

transmit, to the base station via the transceiver, signaling based at least in part on the receiving of the system information block, the signaling indicating an access request to establish a communication link with the base station over the air-to-ground wireless communications network, wherein the transmitting of the signaling indicating the access request is based at least in part on the identifying of the unified access control barring information that is based at least in part on the one or more access identities or the one or more access categories; and communicate, via the transceiver, with the base station over the air-to-ground wireless communications network based at least in part on the transmitting of the signaling.

13. The apparatus of claim 12, wherein the one or more access identities or the one or more access categories are dedicated for UEs communicating over the air-to-ground wireless communications network.

14. An apparatus for wireless communications:

a transceiver;

a processor;

memory coupled with the processor; and instructions stored in the memory and operable, when executed by the processor, to cause the apparatus to:

receive, from a base station via the transceiver, a system information block comprising unified access control barring information for communications over an air-to-ground wireless communications network;

identify, in the system information block, second unified access control barring information dedicated for terrestrial wireless devices communicating over the air-to-ground wireless communications network;

transmit, to the base station via the transceiver, signaling based at least in part on the receiving of the system information block, the signaling indicating an access request to establish a communication link with the base station over the air-to-ground wireless communications network, wherein the transmitting of the signaling indicating the access request is based at least in part on the identifying of the second unified access control barring information; and communicate, via the transceiver, with the base station over the air-to-ground wireless communications network based at least in part on the transmitting of the signaling.

15. The apparatus of claim 14, wherein the instructions are further executable by the processor to cause the apparatus to:

select the unified access control barring information or the second unified access control barring information to use for accessing the air-to-ground wireless communications network, wherein the transmitting of the signaling indicating the access request is based at least in part on the selecting of the unified access control barring information or the second unified access control barring information.

16. An apparatus for wireless communications, comprising:

a transceiver;

a processor;

memory coupled with the processor; and instructions stored in the memory and operable, when executed by the processor, to cause the apparatus to:

broadcast, via the transceiver, a system information block comprising unified access control barring information for communications over an air-to-ground wireless communications network;

receive, from a user equipment (UE) via the transceiver, signaling based at least in part on the broadcasting of the system information block, the signaling indicating an access request to establish a communication link with the apparatus over the air-to-ground wireless communications network; and communicate, via the transceiver, with the UE over the air-to-ground wireless communications network based at least in part on the receiving of the signaling, wherein:

the unified access control barring information is broadcasted in one or more information elements of a barring information element in the system information block, the one or more information elements being dedicated for UEs communicating over the air-to-ground wireless communications network, and the receiving of the signaling indicating the access request is based at least in part on the broadcasting of the unified access control barring information in the one or more information elements, the system information block comprises one or more access identities in a barring information element of the system information block, the one or more access identities being associated with the unified access control barring information, and the receiving of the signaling indicating the access request is based at least in part on the broadcasting of the one or more access identities, the system information block comprises one or more access categories in a barring information element of the system information block, the one or more access categories being associated with the unified access control barring information, and the receiving of the signaling indicating the access request is based at least in part on the broadcasting of the one or more access categories; or the system information block comprises a second unified access control barring information dedicated for terrestrial wireless devices communicating over the air-to-ground wireless communications network, and the broadcasting of the second unified access control barring information is based at least in part on a congestion metric at the apparatus, a time of day, or both.

17. The apparatus of claim 16, wherein the one or more access identities or the one or more access categories are dedicated for UEs communicating over the air-to-ground wireless communications network.

18. The apparatus of claim 16, wherein the instructions are further executable by the processor to cause the apparatus to:

receive, from a second UE via the transceiver, second signaling based at least in part on the broadcasting of the second unified access control barring information, the second signaling indicating a second access request to establish a second communication link with the apparatus over the air-to-ground wireless communications network; and communicate, via the transceiver, with the second UE over the air-to-ground wireless communications network based at least in part on the receiving of the second signaling.

19. The apparatus of claim 16, wherein the instructions are further executable by the processor to cause the apparatus to:

transmit, to the UE via the transceiver, second signaling indicating one or more transmission parameters associated with the air-to-ground wireless communications network, wherein the communicating with the UE is further based at least in part on the transmitting of the second signaling.

20. The apparatus of claim 16, wherein the one or more transmission parameters comprise a timing advance value, a subcarrier spacing, a cyclic prefix length, or any combination thereof.

21. The apparatus of claim 16, wherein the access request comprises a random access request of a random access channel procedure.

22. The apparatus of claim 16, wherein the air-to-ground wireless communications network is configured for aircraft passenger communications, air traffic management, aircraft surveillance, aircraft maintenance, or any combination thereof.

* * * * *